United States Patent
Coustaud et al.

(10) Patent No.: US 11,594,002 B2
(45) Date of Patent: *Feb. 28, 2023

(54) OVERLAY AND MANIPULATION OF MEDICAL IMAGES IN A VIRTUAL ENVIRONMENT

(71) Applicant: General Electric Company, Schenectady, NY (US)

(72) Inventors: Nicolas Coustaud, Buc (FR); Adeline Digard, Buc (FR); Yannick LeBerre, Buc (FR); Ludovic Avot, Buc (FR); Jerome Knoplioch, Buc (FR)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/360,884

(22) Filed: Jun. 28, 2021

(65) Prior Publication Data

US 2021/0327159 A1    Oct. 21, 2021

Related U.S. Application Data

(63) Continuation of application No. 16/146,596, filed on Sep. 28, 2018, now Pat. No. 11,062,527.

(51) Int. Cl.
*G06T 19/20* (2011.01)
*G06T 7/00* (2017.01)
*G06T 11/60* (2006.01)
*G06T 19/00* (2011.01)

(52) U.S. Cl.
CPC ............ *G06T 19/20* (2013.01); *G06T 7/0012* (2013.01); *G06T 11/60* (2013.01); *G06T 19/003* (2013.01)

(58) Field of Classification Search
CPC ....... G06T 11/206; G06Q 50/01; H04L 67/22; H04L 63/065; H04L 63/102
USPC ......................................................... 345/440
See application file for complete search history.

(56) References Cited

U.S. PATENT DOCUMENTS

| | | | |
|---|---|---|---|
| 8,078,000 B2 * | 12/2011 | Bohm | G06T 19/00 382/274 |
| 10,105,168 B2 * | 10/2018 | Blau | A61B 17/1721 |
| 2016/0191887 A1 * | 6/2016 | Casas | H04N 13/111 348/47 |
| 2017/0020630 A1 * | 1/2017 | Johnson | A61B 90/361 |
| 2018/0053335 A1 * | 2/2018 | Kosmecki | A61B 1/04 |
| 2019/0164346 A1 * | 5/2019 | Kim | G06F 3/011 |
| 2020/0138518 A1 * | 5/2020 | Lang | A61B 5/05 |

* cited by examiner

*Primary Examiner* — Samantha (Yuehan) Wang

(57) ABSTRACT

Methods, apparatus, systems and articles of manufacture are disclosed to enable medical image visualization and interaction in a virtual environment. An example apparatus includes at least one processor and at least one memory including instructions. The instructions, when executed, cause the at least one processor to at least: generate a virtual environment for display of image content via a virtual reality display device; enable interaction with the image content in the virtual environment via an avatar; adjust the image content in the virtual environment based on the interaction; and generate an output of image content from the virtual environment.

20 Claims, 17 Drawing Sheets

OVERLAY AND MANIPULATION OF MEDICAL IMAGES IN A VIRTUAL ENVIRONMENT

CROSS-REFERENCE TO RELATED APPLICATIONS

The present application claims priority to and is a continuation of U.S. patent application Ser. No. 16/146,596, filed Sep. 28, 2018, the contents of which are incorporated herein in their entirety.

FIELD OF THE DISCLOSURE

This disclosure relates generally to medical image processing, and, more particularly, to medical image visualization and interaction in a virtual environment.

BACKGROUND

Many different types of medical imaging exist in the medical field including X-ray, magnetic resonance imaging (MRI), ultrasound, computed tomography (CT), positron emission tomography (PET), etc. After a patient is scanned a resulting image can be displayed in a variety of ways. For example, an X-ray image can be printed out on a film and shown to a radiologist to diagnose an injury, or the X-ray image film may be shown to a patient allowing for transparency in patient care. A physically printed film limits the viewer to a two-dimensional (2D) view of the scan. Alternatively, many exams can be displayed on a monitor, including a television, computer monitor, tablet, etc. A monitor can offer several advantages over a printed film for certain exams allowing rapid navigation between images. Digital images displayed on a monitor, depending on the type of exam, can offer the ability to zoom into certain areas of an exam as well as an ability to rotate the image for a different viewing angle. Although an image displayed on a digital monitor may provide dynamic points of viewing, this method of viewing can still be improved upon, as the user cannot truly interact with the image data.

BRIEF DESCRIPTION OF THE DRAWINGS

The figures are not scale. Wherever possible, the same reference numbers will be used throughout the drawings and accompanying written description to refer to the same or like parts.

BRIEF DESCRIPTION

Figure 1:
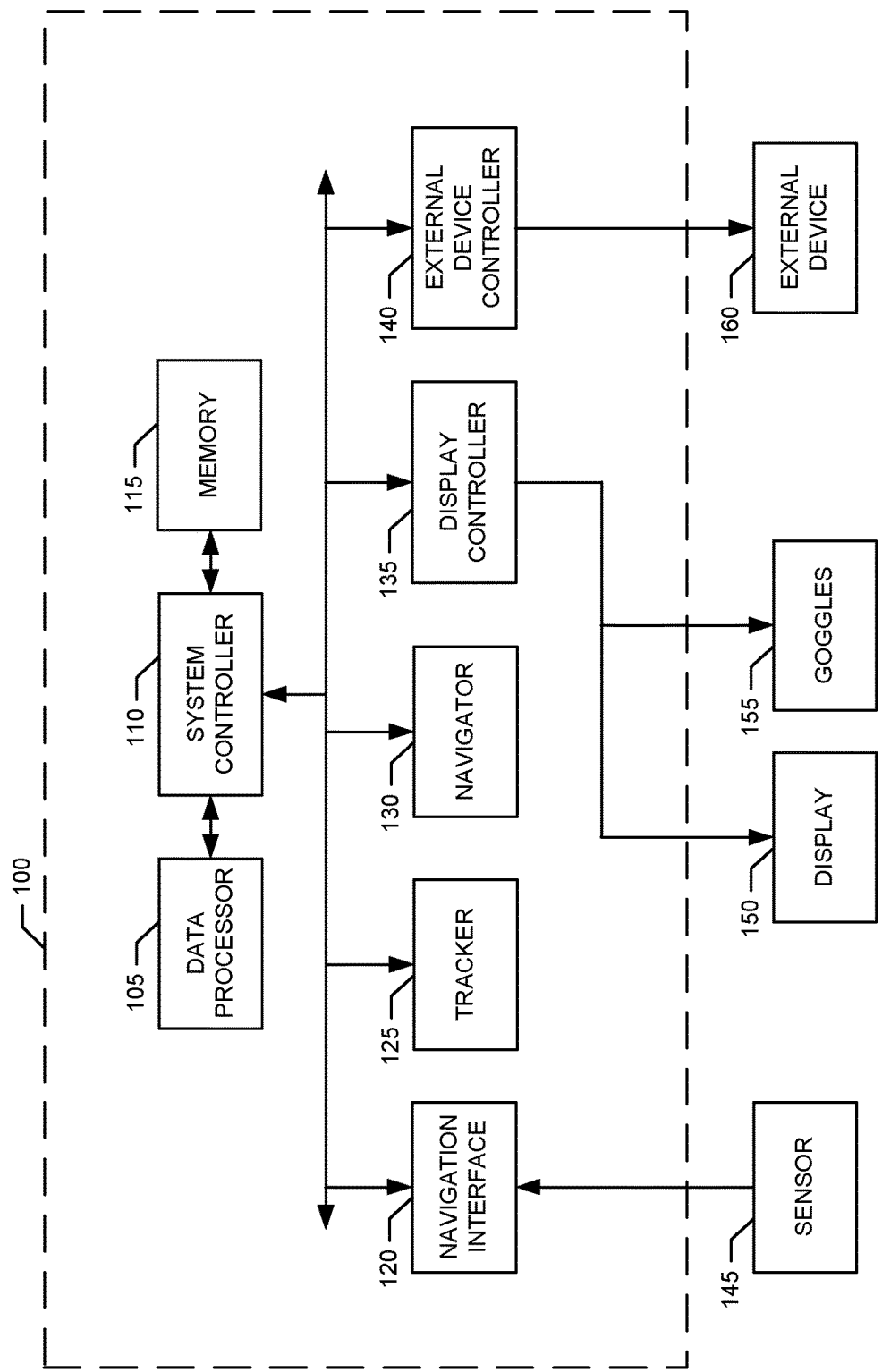
FIG. 1 illustrates an example medical image visualization and interaction apparatus.

Certain examples provide for overlay and manipulation of medical images in a virtual environment.

An example medical image visualization and interaction apparatus includes at least one processor and at least one memory including instructions. The instructions, when executed, cause the at least one processor to at least: generate a virtual environment for display of image content via a virtual reality display device, the image content to include a two-dimensional image overlaid on a three-dimensional volume; enable interaction with the image content in the virtual environment via an avatar, movement of the avatar to be correlated with an external input; adjust the image content in the virtual environment based on the interaction; and generate an output of image content from the virtual environment.

An example non-transitory computer readable storage medium includes instructions which, when executed, cause at least one processor to at least: generate a virtual environment for display of image content via a virtual reality display device, the image content to include a two-dimensional image overlaid on a three-dimensional volume; enable interaction with the image content in the virtual environment via an avatar, movement of the avatar to be correlated with an external input; adjust the image content in the virtual environment based on the interaction; and generate an output of image content from the virtual environment.

An example computer-implemented method includes: generating, by executing an instruction using at least one processor, a virtual environment for display of image content via a virtual reality display device, the image content to include a two-dimensional image overlaid on a three-dimensional volume; enabling, by executing an instruction using the at least one processor, interaction with the image content in the virtual environment via an avatar, movement of the avatar to be correlated with an external input; adjusting, by executing an instruction using the at least one processor, the image content in the virtual environment based on the interaction; and generating, by executing an instruction using the at least one processor, an output of image content from the virtual environment.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe an exemplary implementation and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As used herein, the terms "system," "unit," "module," "engine," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, engine, or system may include a hard-wired device that performs operations based on hard-wired logic of the device. Various modules, units, engines, and/or systems shown in the attached figures may represent the hardware that operates based on software or hardwired instructions, the software that directs hardware to perform the operations, or a combination thereof.

Certain examples provide an overlay and manipulation of several types of medical images in a three-dimensional (3D) and/or four-dimensional (4D) (e.g., over time) immersive virtual environment, which provides an improvement to display of and interaction with medical images. Certain examples include a set of goggles and/or other virtual reality display device that displays, in a virtual reality (VR) environment, medical images. The images can include 2D images, such as an X-ray or CT scan, that can now be rotated and magnified in the VR environment. In addition, 3D images can be displayed freely in the VR environment providing the user with an immersive view into the medical scan. Images displayed in the VR environment can also be digitally generated models. The virtual portrayal of an organ or the human anatomy can provide the user with a better understanding and enhanced context surrounding an area of interest. For example, if a scan shows the presence of a tumor on the surface of an organ, the VR goggles can display a virtual representation of the organ and the tumor so that the user can better visualize the exact location of the tumor in a 3D environment rather than viewing the tumor on a 2D image of the organ. Certain examples also provide a method and mechanism to scan and/or to take a previously scanned 3D object, such as a tool, implant, etc., and display it in the VR environment. Additionally, a never-before-seen object can be scanned and displayed in the VR environment. Such scanned objects can then be incorporated into the multi-image overlay for display, interaction, surgical planning, etc.

The VR environment allows the user, using hand motions and gestures or voice input, to manipulate the image being displayed. A virtual representation of an organ or the human anatomy can easily be rotated and manipulated in response to the user interaction. Toggling between different cuts of a scan can also be achieved by user interaction. Similarly, an object scanned into the VR environment, such as a medical device or instrument, can be rotated and enlarged at the control of the user. The VR goggles can also allow a dynamic view of a medical scan. More specifically, the user can view the surface of a 3D medical image or choose instead to get a view of the details under the surface. For example, if a volumetric view of a scan exists the user can manipulate the scan to navigate between different cuts of the volumetric scan.

Certain examples improve image and content representation and interaction, as well as surgical and/or other procedure planning, through integration and overlay of multiple images. The overlay of images can include any combination of different medical scans, virtual representations of human organs or anatomy, and imported scans of other objects such as medical devices and instruments, for example. An example overlay includes the combination of a CT scan and a PET scan. The overlaid scans can be rotated and enlarged to focus on areas relevant to the user, for example. Another example overlay includes the joining of a virtual representation of an organ or the human anatomy with a patient's medical scan. The union of a virtual representation of an organ or the human anatomy with an imported scan is another example of a VR overlay. If the imported scan is a medical device such as a pacemaker, the VR environment can give the user an accurate look into where and how the pacemaker might fit into the patient's body. A virtual representation of a tumor or lesion may also be overlaid with a medical scan to further highlight its location in relation to the rest of the patient's body, for example. Alternatively or in addition, if the imported scan is a medical instrument such as an incision knife or scissors, the VR environment can help the user visualize how an operation might be performed including the best surgical path to perform an operation. If desired, the user can make bookmarks or annotations in the VR environment. Among other functionalities, these annotations can help plot a surgical path, position an instrument and/or implant, place clinician notes on a scan, etc.

Certain examples provide many benefits not previously seen in the medical industry. The immersive VR environment provides the user with an increased number of viewing angles and vantage points into a patient. Additionally, an ability to overlay different scans and virtual representations gives the user a unique visual context when viewing the images. The VR goggles can display internal views of organs and blood vessels in addition to the surface views. Functional scans, such as PET scans, can display motion within the body, including blood flow or tumor growth. Overlaying data from this functional scan with another scan or a virtual representation of the human anatomy further helps the user focus on and diagnosis an area in the patient's body. Without the VR environment, a 3D image displayed on a 2D monitor can be manipulated and provides the viewer with a distorted view of the structure. Additionally, rather than having to stitch a mental picture of two separate images together, the user can rely on the VR goggles to overlay the images. Mental workload for the user is reduced, allowing the clinician to dedicate time elsewhere. The overlay of images, as well as possible annotations and bookmarks, can ensure a uniform and consistent view across users by being shared with a patient and other members involved with patient care. The patient can have more confidence in their care providers and the care providers can be more confident when making medical decisions and when plotting at path for surgery. Certain examples provide more information to the medical staff and reduce the chance of any surprises and complications.

FIG. 1 illustrates an example medical image visualization and interaction apparatus 100. The example apparatus 100 includes a data processor 105, a system controller 110, and a memory 115. The data processor 105, system controller 110, and memory 115 communicate with a plurality of controllers including a navigation interface 120, a tracker 125, a navigator 130, a display controller 135, and an external device controller 140.

The processor 105, system controller 110, and memory 115 work together to create a virtual environment for visualization of and interaction with medical image and/or other clinical data. As shown in the example of FIG. 1, the navigator interface 130 interacts with a sensor 145 to obtain input and/or feedback from the sensor 145 (e.g., a position sensor, a touch sensor, a gesture sensor, a haptic sensor, an alphanumeric sensor, etc.) to be translated into an interaction, movement, and/or other command for interaction in the virtual environment. The tracker 125 and navigator 130 process input/feedback received from the sensor 145 via the navigator interface 120 to determine an affect of the sensor 145 input/feedback on position, view, interaction, command, etc., in the virtual environment. Thus, the tracker 125 and navigator 130 process information received through the navigator interface 120 to determine a position, gesture, force, and/or other input/feedback obtained via the sensor 145 to navigate in the virtual environment and interact with content (e.g., two-dimensional, three-dimensional, and/or four-dimensional images, associated data, and/or other clinical information, etc.) made available in the virtual environment.

For example, the navigation interface 120 receives digitized signals from the sensor 145. The navigation interface 120 transmits the digitized signals to the tracker 125. The tracker 125 calculates position and orientation information based on the received digitized signals. This position and orientation information provides a location of interaction with the virtual environment. The tracker 125 communicates position and orientation information to the navigator 130. The navigator 130 registers the location of interaction with the virtual environment. For example, if a user is trying to manipulate a composite image in the virtual environment by pulling the image with his/her hands, the navigator 130 converts that sensor 145 information, as processed into position and orientation information by the tracker 125, into an effect on the composite image in the virtual environment.

The example display controller 135 facilitates display of the virtual environment via one or more connected devices such as a monitor/display 150, virtual reality (VR) goggles and/or other virtual reality display device 155, etc. Thus, the example display controller 135 conveys the virtual environment to one or more viewers, users, etc., via the connected display 150 and/or goggle 155 devices, enabling viewing of the virtual environment for interaction via the sensor(s) 145, etc.

The example external device controller 140 coordinates interaction of an external device 160 with the system 100 and its virtual environment. For example, the external device 160 can include a scanner, a modeler, an imaging device, an electronic medical record (EMR), a picture archiving and communication system (PACS), a radiology information system (RIS), a laboratory information system (LIS), a cardiovascular information system (CVIS), a vendor-neutral archive, an enterprise archive, an imaging desktop, a workstation, an edge device, a cloud-based server, a billing processor, etc.

In certain examples, the external device 160 includes a modeler or scanner that allows an implant, instrument, tool, and/or other component to be placed into the scanner, specified/defined in the modeler, etc., and translated from a physical item to an electronic construct for use in the virtual environment (e.g., in a mesh format, etc.). Thus, a new tool, implant, etc., that does not have an electronic analog in the virtual environment can be modeled and inserted into the virtual environment as an electronic avatar or digital twin of the physical device, for example.

In certain examples, the data processor 105, system controller 110, and display controller 135 work together to overlay a plurality of medical images of different types in a 3D virtual environment. For example, several medical images can be provided for the same patient but of different types (e.g., from different types of scanners, medical devices, etc.). VR goggles 155 can provide stereoscopic display of the medical image(s). Input from the sensor 145 such as position and motion sensing, etc., from sensor devices 145 that detect hand motions, gestures, etc.

The virtual environment can display objects from a physical scene (e.g., constructed from photographs, video, other pictures/renderings, etc.), devices and/or medical instruments (e.g., modeled from physical devices/instruments, etc.), voice input, location of virtual or avatar hands, avatar(s) representing user(s)/person(s) involved in manipulating and/or otherwise impacted by the virtual environment, etc. In certain examples, the virtual environment displays external view(s) of an anatomy of interest, internal view(s) of an anatomy of interest (e.g., inside organs, vessels, along endoscopic viewing angles, etc.), combinations of internal and external views, etc.

For example, the virtual environment can display an overlay of an anatomical X-ray CT (x-ray computed tomography) image, an MRI (Magnetic Resonance Imaging) image, a functional PET (Positron Emission Tomography), and/or a SPECT (single-photon emission computed tomography) image in combination via the virtual environment. In certain examples, the overlay can include a CT scanner image and one or more ultrasound images. In certain examples, the virtual environment can display an overlay of CT scanner anatomical images and CT scanner temporal images. In certain examples, the virtual environment can display an overlay of MRI anatomical images and MRI temporal images. Images can be displayed in the virtual environment as 3D volumes, 2D cuts, maximum intensity projection (MIP) vies, etc.

A plurality of images and image types can be loaded onto a 3D immersive view in the virtual environment. Images are combined and can be manipulated and displayed in a variety of ways. For example, cuts of a 3D volume can be associated with a 2D display and/or other 3D volume (e.g., adjust a cut on a CT scanner volume and display the result of the cut on a 2D view of a different nature, etc.). In another example, an anatomy can be displayed in 3D, and a 3D volume of a functional acquisition can be overlaid on the anatomy.

Existing 3D navigation has so far been limited to anatomical views, possibly with external objects such as surgical devices or implants overlaid on the surfaces or volumes created from these anatomical views. In many contexts, however, functional information provides other key elements to understand a patient condition and/or define treatment strategies. Some examples include: motion (e.g., blood flow, cardiac wall motion, tumor motion, etc.); functional information derived from modalities such as PET, diffusion-weighted imaging (DWI), etc., showing metabolism, especially potentially active parts of tumors; perfusion maps highlighting infarcted or ischemic regions; electrical activity; temperature maps from MR; information on lesions derived from quantitative software highlighting weak and/or obstructed parts of the anatomy; etc.

Today, such information is shown as separate images, which introduces a number of challenges. For example, users may form a distorted mental image of the 3D anatomy because anatomy and function are shown separately. The extent of tumor regions or their relative location to surgical paths may not be understood accurately, for example. Additionally, measurement and bookmarking tools cannot be placed with a complete context. Measuring and/or bookmarking regions to be treated should be done with both anatomical constraints and physiology information, for example. Further, time and mental workload can suffer from the separation. Users have to review and analyze two data sets and then correlate them, for example. Translating such analysis is also difficult since other persons involved in patient care will have to rely on words and conclusions from primary users of the system rather than clear images.

To improve the technology and functionality of medical image data display and interaction, fusing anatomy and function in the virtual environment forms an accurate combined view of all available information. Such fusion enables direct use of bookmarking and measurement tools from combined images and reduces time and mental workload by providing a single view, ready to be shared with the group involved in patient care, for example. Certain examples provide fused 3D views and fused 2D cuts in the virtual environment, for example.

For clinicians, fused information/image interaction in the virtual environment provides a better and faster understanding of pathology(-ies) location, faster procedures with less risk of surprise, an ability to select the best surgical/interventional strategy, etc., as well as an increased audience of 3D advanced visualization to medical staff. Additionally, the virtual environment provided by the example apparatus 100 can connect with pre-operative and in-room imaging systems to enhance the value and capability of the imaging ecosystem.

Figure 2:
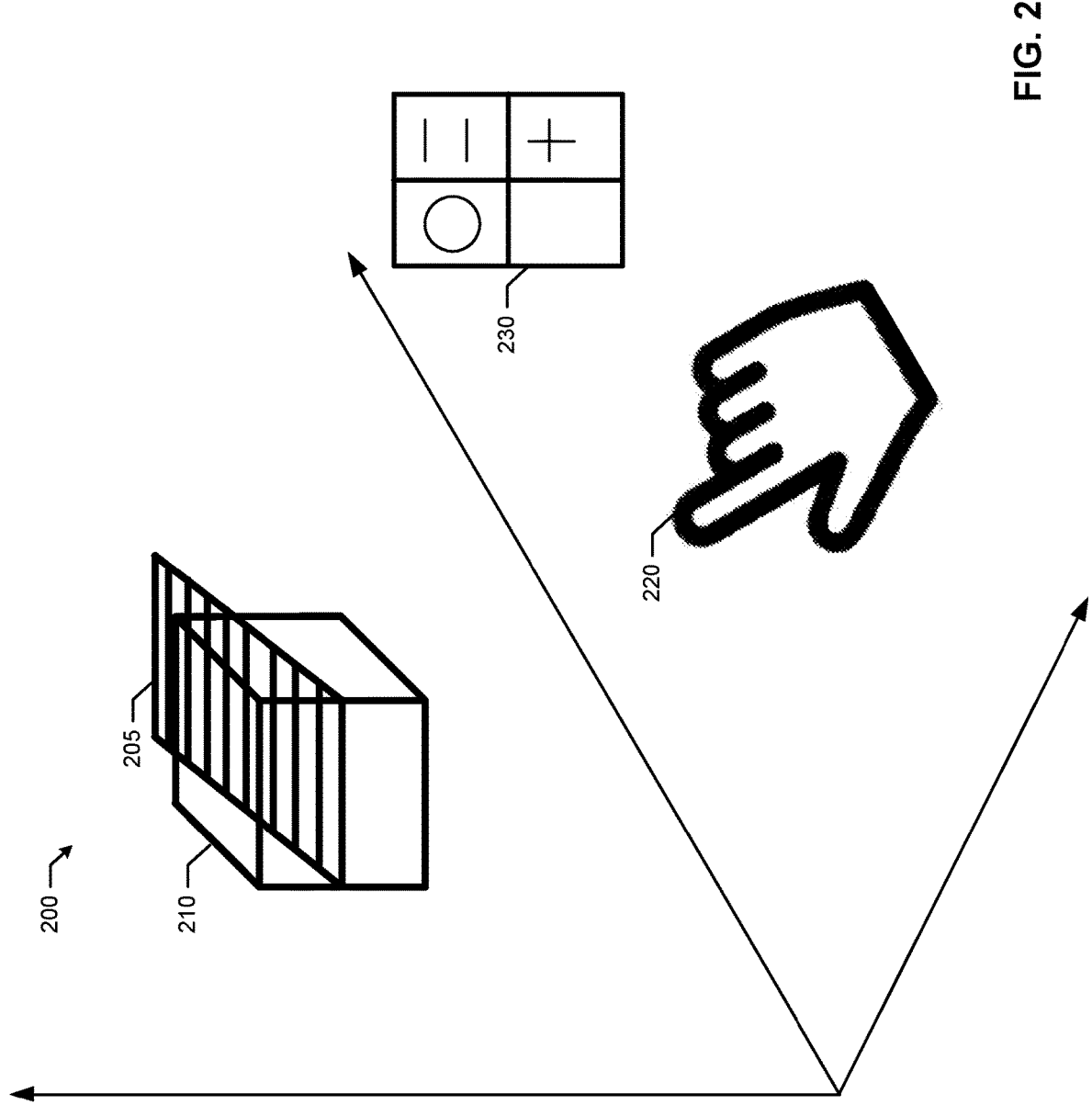
FIG. 2 depicts an example virtual environment including a two-dimensional image slice overlaid on a three-dimensional image volume.

FIG. 2 depicts an example virtual environment 200 including a 2D image slice 205 overlaid on a 3D image volume 210. Within the virtual environment 200, the user can interact with the composite of 2D 205 and 3D 210 image information via an avatar and/or other virtual representation of themselves, such as a stylized hand 220, etc. The virtual hand 220 can mimic the user's hand movement and/or otherwise be controlled (e.g., by gesture, by touchpad, by mouse, by joystick, by sensor glove, etc.) to move to a desired location in the virtual environment 200. In certain examples, a menu 230 can be activated in the virtual environment 200 to facilitate manipulation of the image(s) 205, 210, annotation, processing, overlay of another image, etc. In certain examples, the user can move the image(s) 205, 210 backward, forward, sideways, rotate, peel apart, combine together, zoom in/out, etc., by manipulating the image(s) 205, 210 via the hand/cursor/other virtual tool 220.

Using the hand 220 in the virtual space 200, image 205, 210 and/or other information can be adjusted more easily than in a traditional 2D on-screen view. For example, presentation can be adjusted and presentation properties such as orientation, contrast, level, other tools, etc., can be adjusted. In the virtual space 200, the user can access to the full 3D/4D content to identify a region of interest and/or an object in the image(s) 205, 210, segment the image(s) 205, 210, manipulate the image(s) 205, 210, etc., which the user is unable to do effectively and with the proper perspective on a 2D screen. In the virtual environment 200, the user has six degrees of freedom to manipulate and adjust the image 205, 210 content, separately and/or in overlaid combination, for example. Via the image(s) 205, 210 and/or the menu 230, the user can access several sets of parameters for the 2D image slice 205, the 3D image volume 210, etc., and can adjust them within the virtual environment 200, for example.

In certain examples, multiple images 205, 210 can be mixed together in virtual space 200 based on imported pixels and/or voxels. An implant, medical device, marker, etc., can be imported into the virtual environment 200 and displayed in the virtual environment 200 with image data 205, 210. Import of an implant/instrument/device can help with surgical planning, for example. For example, the user can leverage the virtual environment 200 to determine how the implant will fit in the patient (e.g., a surgical location), how the surgeon is to access the location (e.g., a surgical path) to place the implant (and avoid other areas of the anatomy), etc.

For example, if the implant is a stent, the user can manipulate the stent in 4D, make annotations, compute measurements, plot a surgical path, etc., in the virtual environment 200. In the virtual environment 200, points can be precisely placed on an image 205, 210 in the 3D space. In contrast, a 2D perspective view appears in 3D but is really a plane. Therefore, to locate a point in 2D, at least two views are needed. Using the virtual environment 200 created by the apparatus 100, only one 3D view is necessary, and there is no ambiguity regarding a location at which a point is placed. Therefore, a precise measurement can be made in the single 3D volume.

Proper visualization is to an ability to adjust two models together. For example, a perspective view may be an approximation of the reality, but, in the virtual environment 200, an accurate version of the anatomy can be displayed and manipulated, allowing a user to look at vessel length, vessel diameter, display MRI data on a PET CT, etc., that is not possible on a regular 2D display.

In certain examples, tools 230 such as a slice thickness adjustment tool can be provided to a user in the virtual environment 200. In certain examples, a slice thickness indicator can be displayed and manipulated by the user in the virtual environment 200 to adjust the displayed slice thickness. A slice selector can also be displayed as part of or separate from the menu of tools 230. For example, a user can select a slice from within a displayed 3D volume to focus operations, 2D slice views, combination between the 2D slice and the 3D volume, etc. In certain examples, slice selection and/or slice thickness adjustment can be facilitated via one or more tools 230 in the virtual environment 200 by sliding a bar, indicator, other slider, etc., to select a slice, expand or contract selected slice thickness, etc.

Certain examples provide a combined or composite view in the virtual environment 200. For example, a 3D view of a heart can be displayed in color with a stent to be positioned with respect to the heart colored in brown for user viewing and manipulation in the virtual environment 200. An image slice from the 3D volume can be displayed in grayscale (e.g., a radiological view include a trace of the aorta into which the stent is to be positioned, etc.). The 3D heart image can be cut at the top to allow the user to view the stent in the virtual environment 200. A control at the top of the 3D volume allows the user to manipulate to increase/decrease a thickness of the view (e.g., in MIP, etc.). In the virtual environment 200, the user can move, maneuver, and adjust both the heart and the stent (e.g., take the heart in one virtual hand 220 and hold the stent in the other virtual hand 220 and move the heart and the stent with respect to each other, etc.).

In certain examples, an MRI scanner can be registered to display a part of a segmented anatomy in the virtual environment 200. The segmented MRI information can be combined with CT scanner data. Different scans, different planes, etc., can be adjusted in the virtual environment 200. The user can interact with each individual representation (e.g., anatomic models, MIP views, 2D slice, MR image, CT image, etc.) to adjust thickness, opacity, position, overlay, measurement, annotation, etc., in the virtual environment 200.

Figure 3:
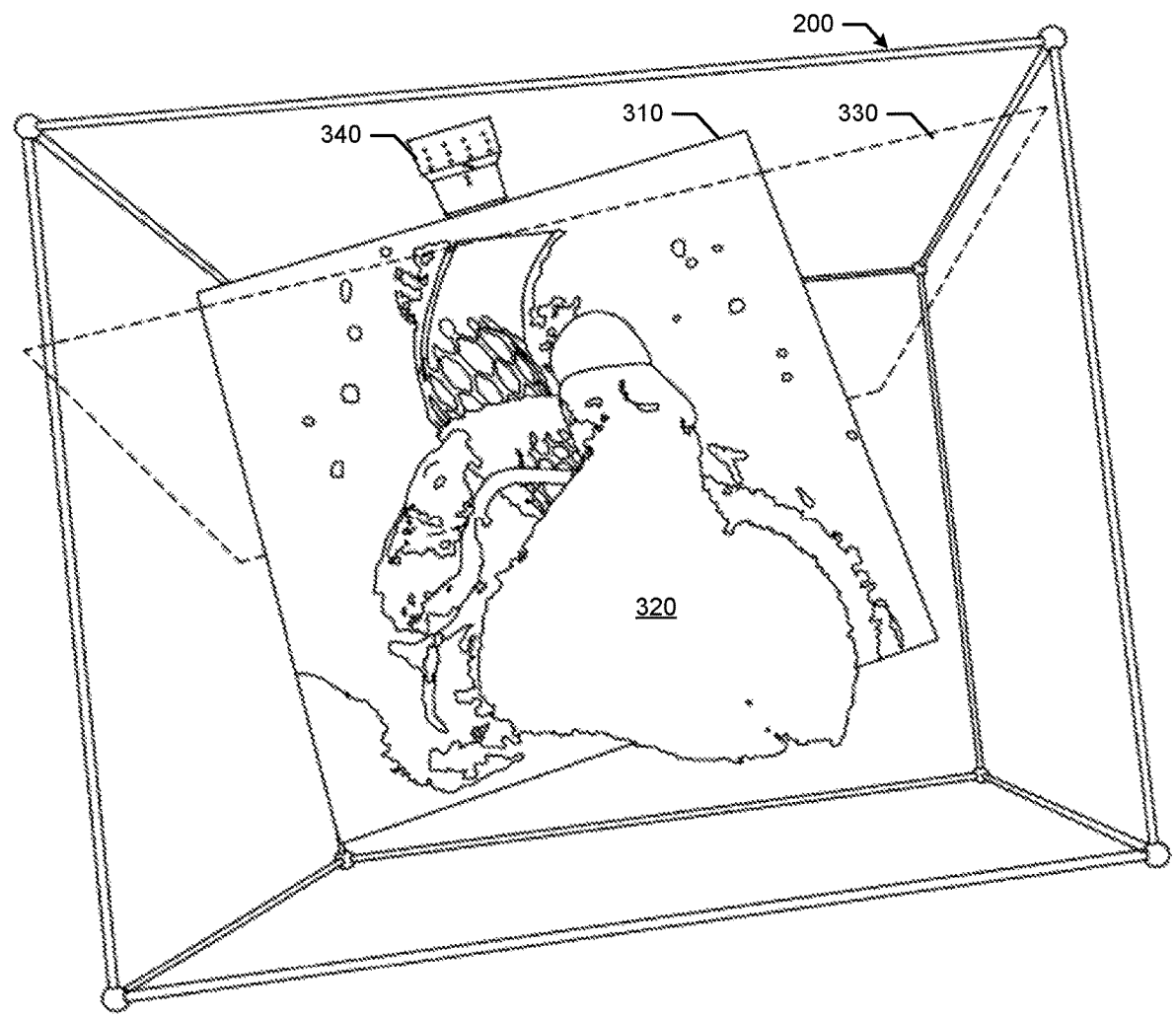
FIGS. 3-10 illustrate example implementations, modes, or snapshots of an example virtual environment provided for user viewing and interaction.
Figure 4:
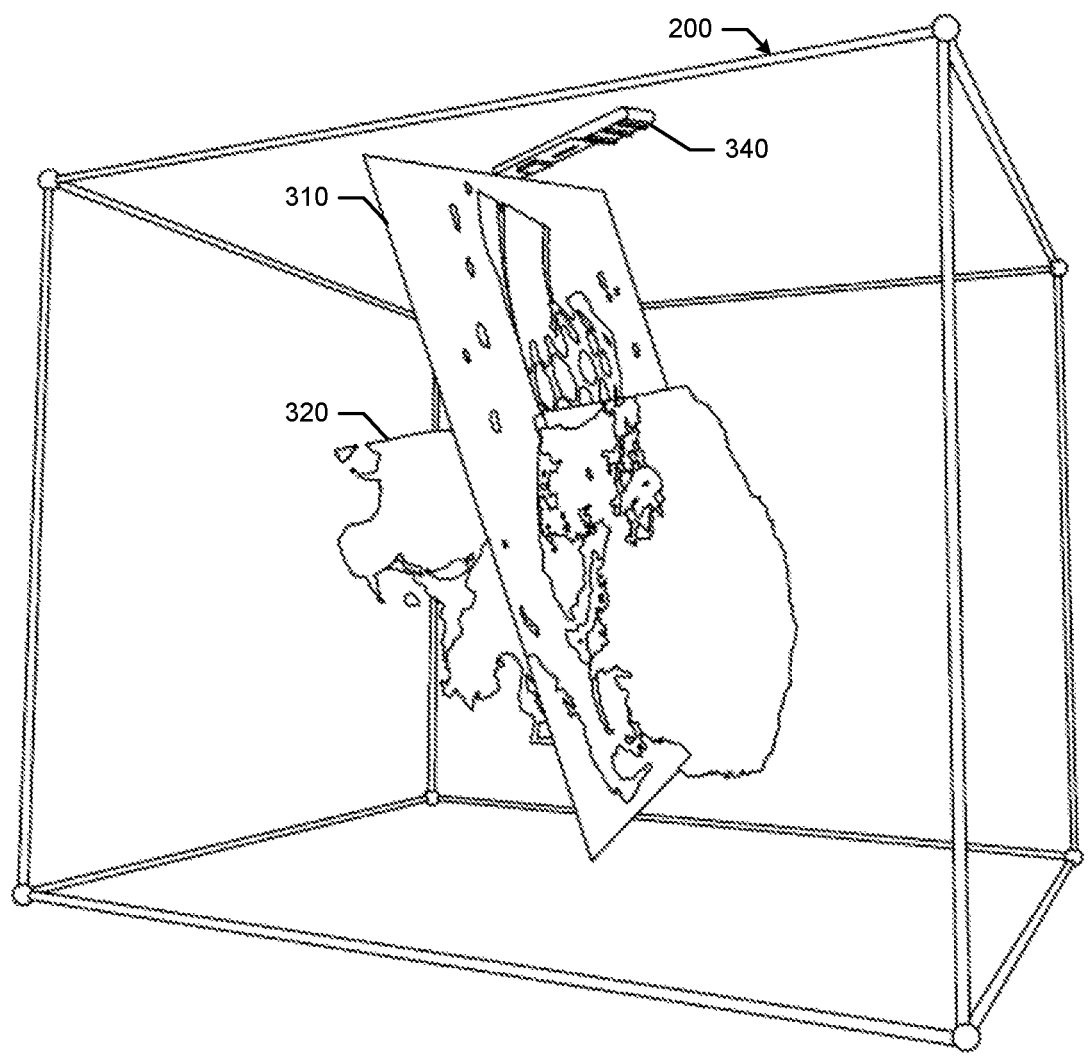

FIGS. 3-10 illustrate example implementations, modes, or snapshots of the example virtual environment 200 provided for user viewing and interaction. FIG. 3 illustrates an example of the virtual environment 200 in which a 2D image 310 is displayed with respect to a 3D volume 320. A dashed plane 330 illustrates a cut of the image 310 with respect to the 3D volume 320. The dashed plane 330 is movable in the virtual environment 200 (e.g., via the hand avatar 220, etc.) to show a particular 2D image cut 310 in the virtual environment 200. A control 340 allows a 2D cut or slice 310 of the 3D image volume 320 to be selected. FIG. 4 shows another view of the virtual environment 20 including the 3D image volume 320, 2D image slice 310, and slice selection control 340 to select the slice 310 for viewing and interaction. As shown in the example of FIGS. 3-4, the 2D image slice 310 and the 3D image volume 320 can be of the same or of different image types.

Figure 5:
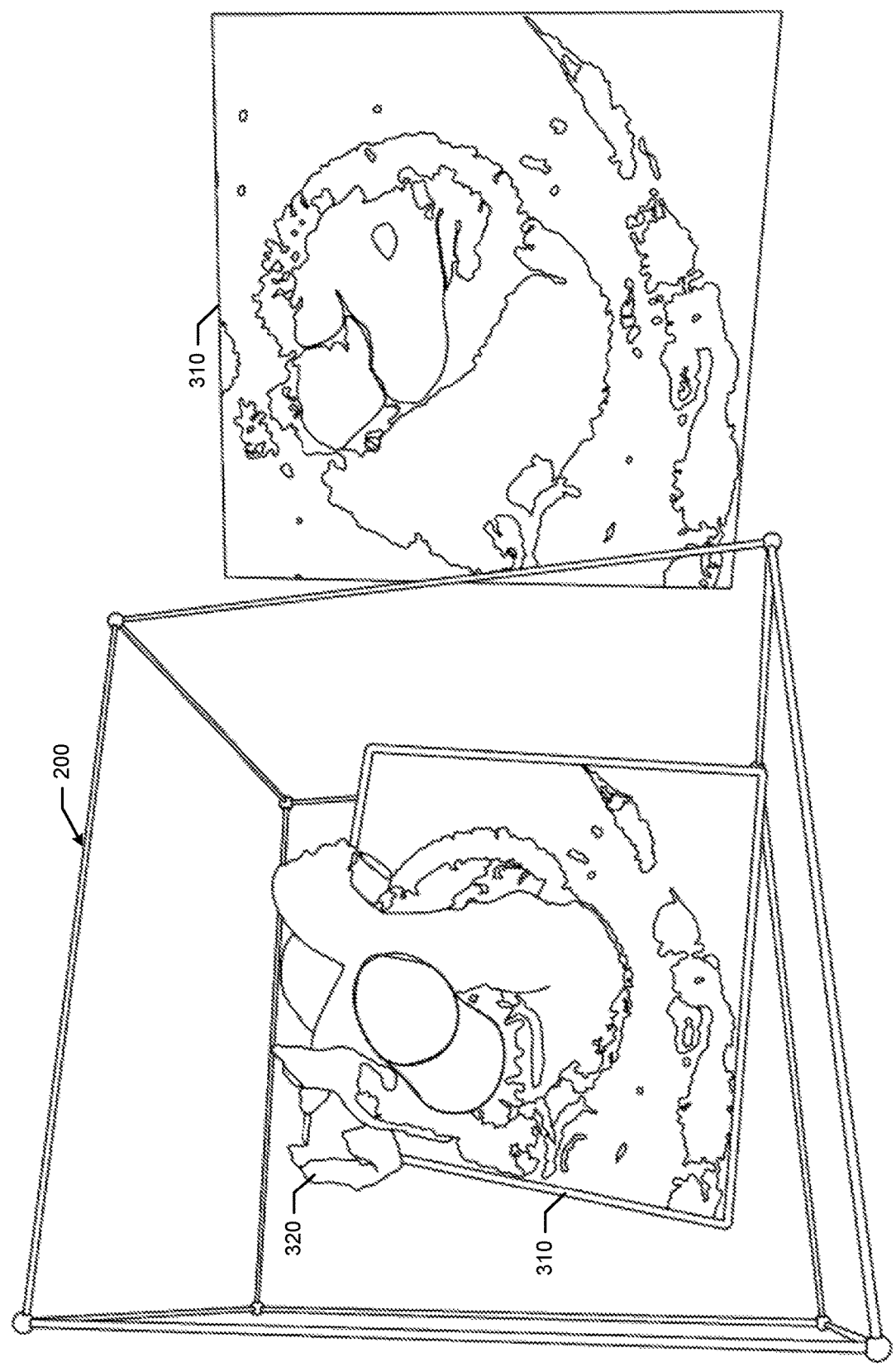
Figure 6:
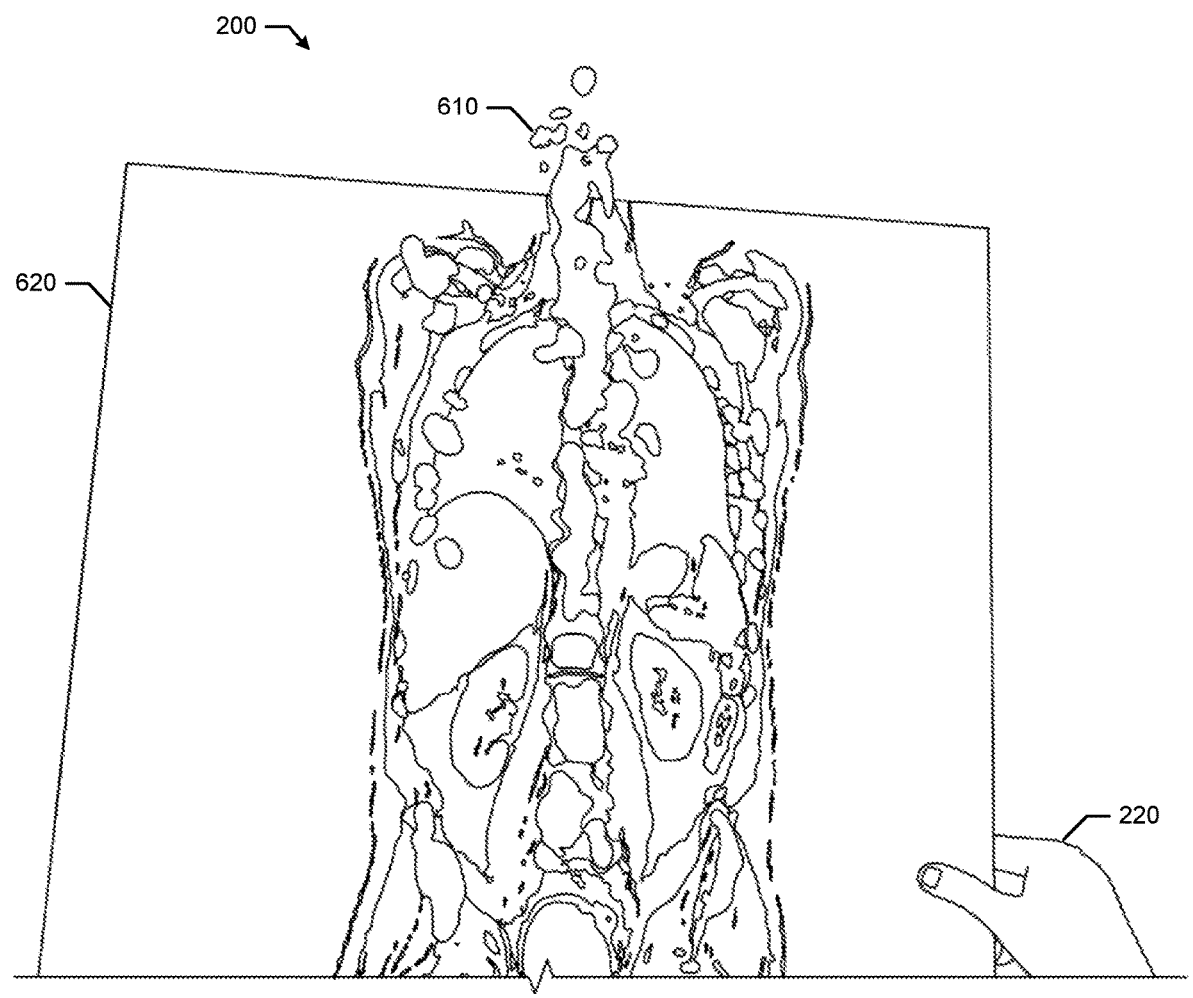
Figure 7:
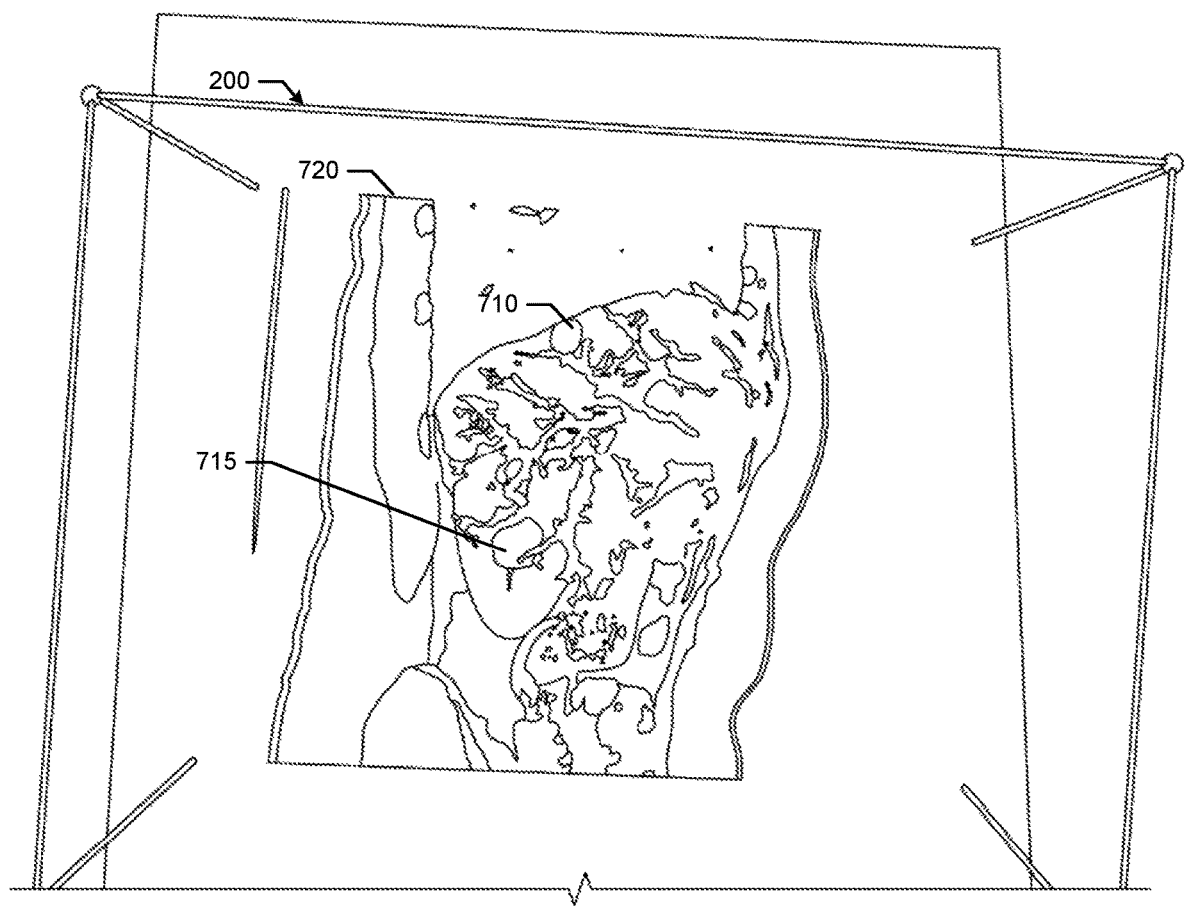

In certain examples, such as shown in FIG. 5, the 2D slice 310 can be extracted from the 3D volume 320 in the virtual environment 200 to be viewed separately in the virtual environment 200 by the user. The example of FIG. 6 shows that, using the avatar hand 220, a user can maneuver a composite image formed from a PET image 610 overlaid on a CT image 620 in the virtual environment 200. As shown in the example of FIG. 7, tumors 710, 715 can be highlighted in a cut image 720 in the virtual environment 200.

Figure 8:
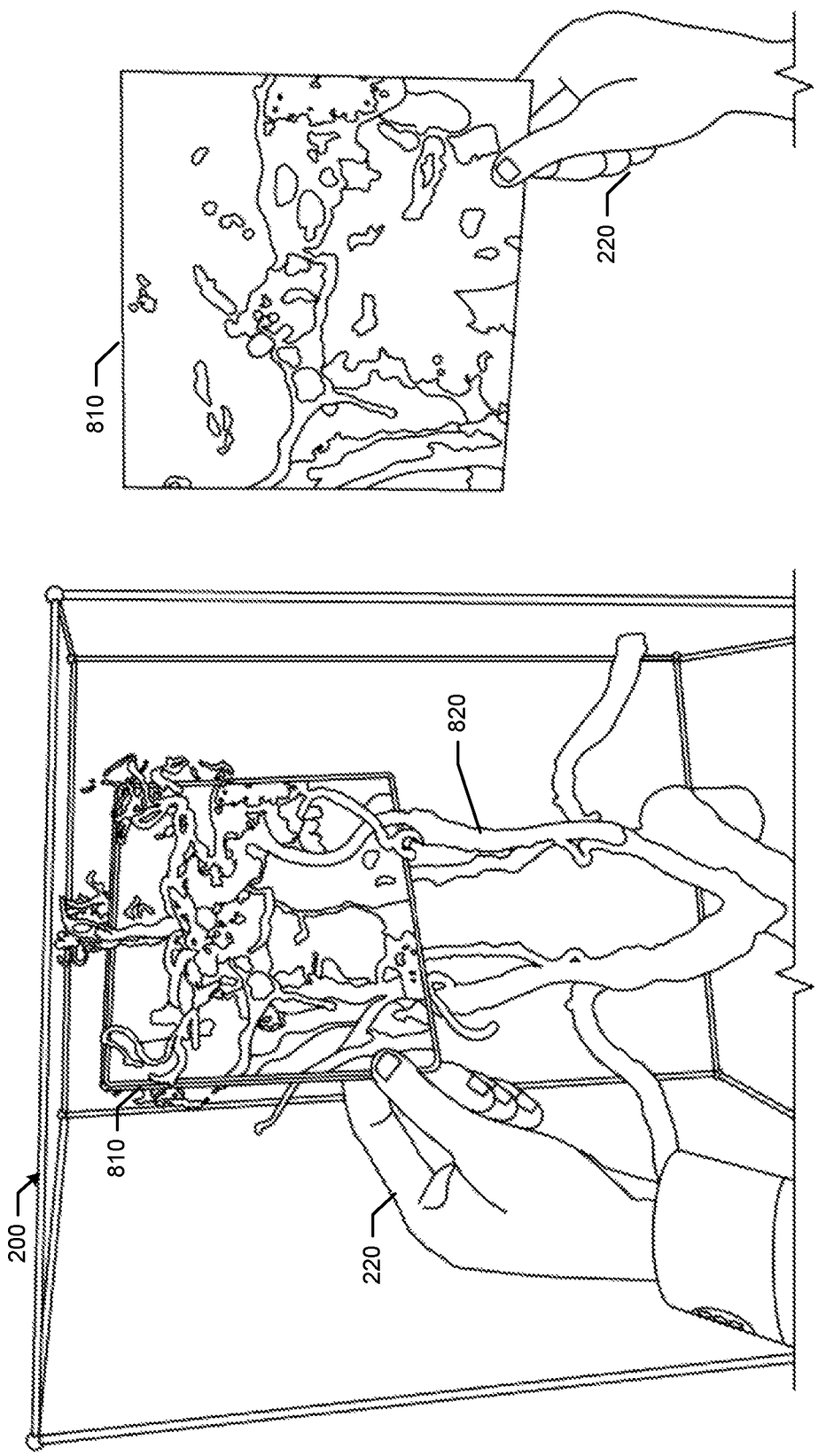
Figure 9:
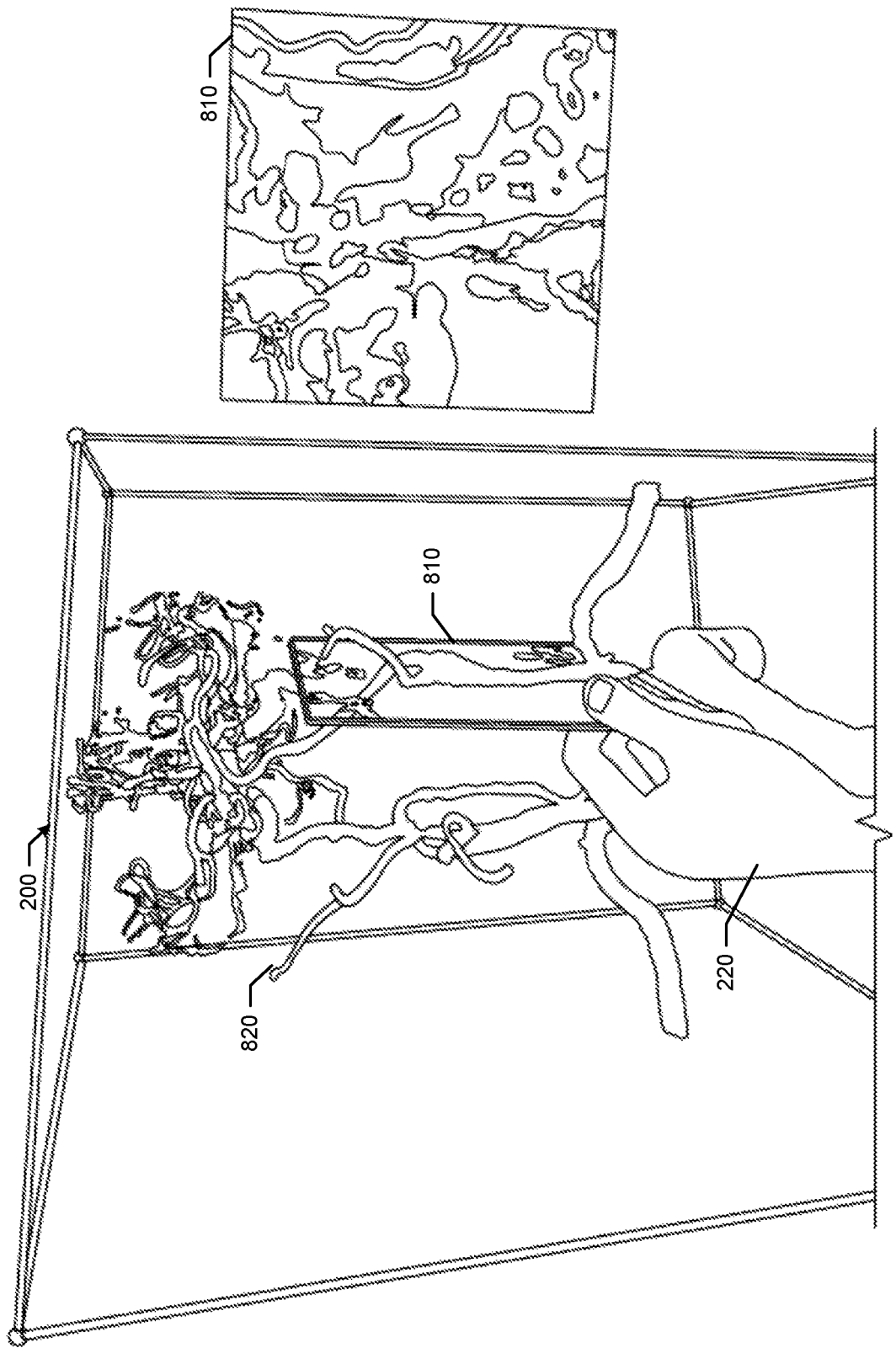
Figure 10:
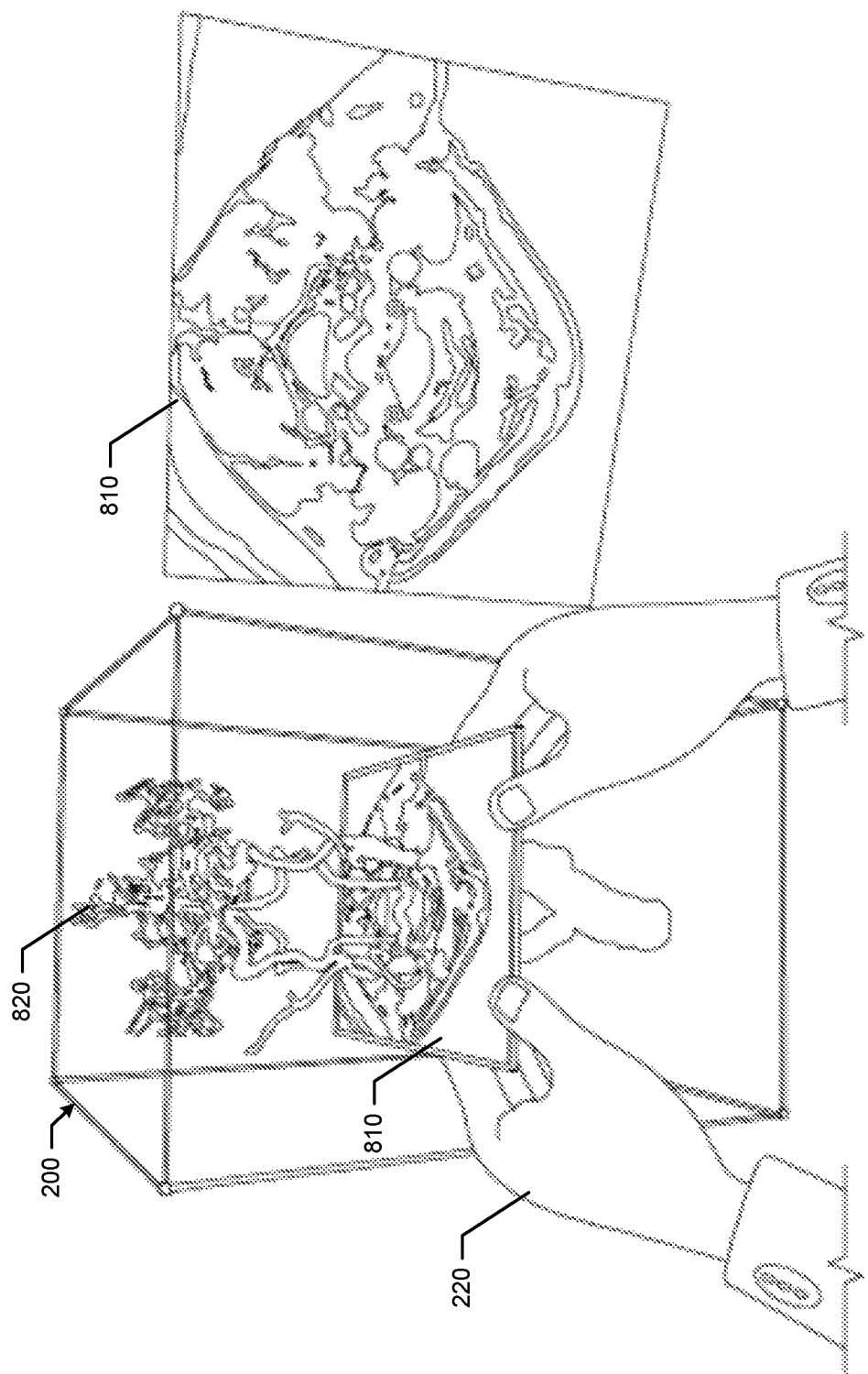

FIGS. 8-10 illustrate various manipulations of image slices within and outside of a 3D image volume shown in the virtual environment 200. For example, FIG. 8 illustrates grasping and removing of a 2D image slice 810 from a 3D image volume 820 using the hand avatar 220 in the virtual environment 200. As shown in the example of FIG. 8, the 2D image slice 810 can be viewed with respect to the 3D volume 820 as well as separate from the 3D volume 820. FIG. 9 shows the virtual environment 200 rotated as the user views the 3D volume 820 and 2D slice 810 from a different angle. The angle of viewing can be adjusted by manipulating the avatar 220, selecting a menu option 230 (not shown), moving a scroll wheel and/or touch pad, clicking a button, etc. FIG. 10 shows a horizontal 2D image slice 1010, rather than a vertical image slice 810, being selected from the 3D volume 1020 and being manipulated by the avatar hands 220 to separate the 2D image 1010 from the 3D image volume 1020, for example. The user can pull the slice 1010 towards him/her, push the image slice 1010 away, etc., using the hands 220, for example.

In certain examples, information displayed in the virtual environment 200, such as implants, instruments, organs, etc., can be modeled as a digital twin. A digital representation, digital model, digital "twin", or digital "shadow" is a digital informational construct about a physical system. That is, digital information can be implemented as a "twin" of a physical device/system/person and information associated with and/or embedded within the physical device/system. The digital twin is linked with the physical system through the lifecycle of the physical system. In certain examples, the digital twin includes a physical object in real space, a digital twin of that physical object that exists in a virtual space, and information linking the physical object with its digital twin. The digital twin exists in a virtual space corresponding to a real space and includes a link for data flow from real space to virtual space as well as a link for information flow from virtual space to real space and virtual sub-spaces.

Figure 11:
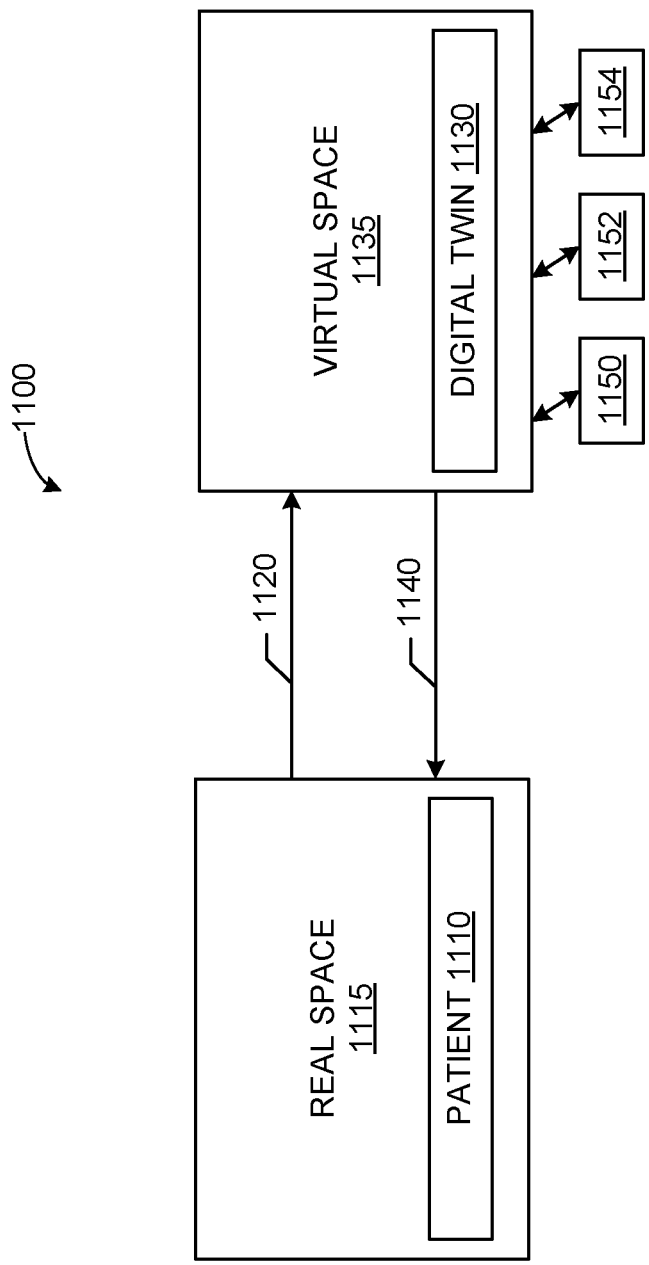
FIG. 11 depicts an example of a digital twin.

For example, FIG. 11 illustrates a patient 1110 in a real space 1115 providing data 1120 to a digital twin 1130 in a virtual space 1135. The digital twin 1130 and/or its virtual space 1135 provide information 1140 back to the real space 1115. The digital twin 1130 and/or virtual space 1135 can also provide information to one or more virtual sub-spaces 1150, 1152, 1154. As shown in the example of FIG. 11, the virtual space 1135 can include and/or be associated with one or more virtual sub-spaces 1150, 1152, 1154, which can be used to model one or more parts of the digital twin 1130 and/or digital "sub-twins" modeling subsystems/subparts of the overall digital twin 1130 (e.g., individual organs of a patient, etc.).

Sensors connected to the physical object (e.g., the patient 110) can collect data and relay the collected data 1120 to the digital twin 1130 (e.g., via self-reporting, using a clinical or other health information system such as a picture archiving and communication system (PACS), radiology information system (RIS), electronic medical record system (EMR), laboratory information system (LIS), cardiovascular information system (CVIS), hospital information system (HIS), and/or combination thereof, etc.). Interaction between the digital twin 1130 and the patient 1110 can help improve diagnosis, treatment, health maintenance, etc., for the patient 1110, for example. An accurate digital description 1130 of the patient 1110 benefiting from a real-time or substantially real-time (e.g., accounting from data transmission, processing, and/or storage delay) allows the system 1100 to predict "failures" in the form of disease, body function, and/or other malady, condition, etc.

In certain examples, obtained images overlaid with sensor data, lab results, etc., can be used in augmented reality (AR) applications when a healthcare practitioner is examining, treating, and/or otherwise caring for the patent 1110. Using AR, the digital twin 1130 follows the patient's response to the interaction with the healthcare practitioner, for example.

Thus, rather than a generic model, the digital twin 1130 is a collection of actual physics-based, anatomically-based, and/or biologically-based models reflecting the patient 1110 and his or her associated norms, conditions, etc. In certain examples, three-dimensional (3D) modeling of the patient 1110 creates the digital twin 1130 for the patient 1110. The digital twin 1130 can be used to view a status of the patient 1110 based on input data 1120 dynamically provided from a source (e.g., from the patient 1110, practitioner, health information system, sensor, etc.).

In certain examples, the digital twin 1130 of the patient 1110 can be used for monitoring, diagnostics, and prognostics for the patient 1110. Using sensor data in combination with historical information, current and/or potential future conditions of the patient 1110 can be identified, predicted, monitored, etc., using the digital twin 1130. Causation, escalation, improvement, etc., can be monitored via the digital twin 1130. Using the digital twin 1130, the patient's 1110 physical behaviors can be simulated and visualized for diagnosis, treatment, monitoring, maintenance, etc.

In contrast to computers, humans do not process information in a sequential, step-by-step process. Instead, people try to conceptualize a problem and understand its context. While a person can review data in reports, tables, etc., the person is most effective when visually reviewing a problem and trying to find its solution. Typically, however, when a person visually processes information, records the information in alphanumeric form, and then tries to re-conceptualize the information visually, information is lost, and the problem-solving process is made much less efficient over time.

Using the digital twin 1130, however, allows a person and/or system to view and evaluate a visualization of a situation (e.g., a patient 1110 and associated patient problem, etc.) without translating to data and back. With the digital twin 1130 in common perspective with the actual patient 1110, physical and virtual information can be viewed together, dynamically and in real time (or substantially real time accounting for data processing, transmission, and/or storage delay). Rather than reading a report, a healthcare practitioner can view and simulate with the digital twin 1130 to evaluate a condition, progression, possible treatment, etc., for the patient 1110. In certain examples, features, conditions, trends, indicators, traits, etc., can be tagged and/or otherwise labeled in the digital twin 1130 to allow the practitioner to quickly and easily view designated parameters, values, trends, alerts, etc.

The digital twin 1130 can also be used for comparison (e.g., to the patient 1110, to a "normal", standard, or reference patient, set of clinical criteria/symptoms, etc.). In certain examples, the digital twin 1130 of the patient 1110 can be used to measure and visualize an ideal or "gold standard" value state for that patient, a margin for error or standard deviation around that value (e.g., positive and/or negative deviation from the gold standard value, etc.), an actual value, a trend of actual values, etc. A difference between the actual value or trend of actual values and the gold standard (e.g., that falls outside the acceptable deviation) can be visualized as an alphanumeric value, a color indication, a pattern, etc.

Further, the digital twin 1130 of the patient 1110 can facilitate collaboration among friends, family, care providers, etc., for the patient 1110. Using the digital twin 1130, conceptualization of the patient 1110 and his/her health can be shared (e.g., according to a care plan, etc.) among multiple people including care providers, family, friends, etc. People do not need to be in the same location as the patient 1110, with each other, etc., and can still view, interact with, and draw conclusions from the same digital twin 1130, for example.

Thus, the digital twin 1130 can be defined as a set of virtual information constructs that describes (e.g., fully describes) the patient 1110 from a micro level (e.g., heart, lungs, foot, anterior cruciate ligament (ACL), stroke history, etc.) to a macro level (e.g., whole anatomy, holistic view, skeletal system, nervous system, vascular system, etc.). In certain examples, the digital twin 1130 can be a reference digital twin (e.g., a digital twin prototype, etc.) and/or a digital twin instance. The reference digital twin represents a prototypical or "gold standard" model of the patient 1110 or of a particular type/category of patient 1110, while one or more reference digital twins represent particular patients 1110. Thus, the digital twin 1130 of a child patient 1110 may be implemented as a child reference digital twin organized according to certain standard or "typical" child characteristics, with a particular digital twin instance representing the particular child patient 1110. In certain examples, multiple digital twin instances can be aggregated into a digital twin aggregate (e.g., to represent an accumulation or combination of multiple child patients sharing a common reference digital twin, etc.). The digital twin aggregate can be used to identify differences, similarities, trends, etc., between children represented by the child digital twin instances, for example.

In certain examples, the virtual space 1135 in which the digital twin 1130 (and/or multiple digital twin instances, etc.) operates is referred to as a digital twin environment. The digital twin environment 1135 provides an integrated, multi-domain physics- and/or biologics-based application space in which to operate the digital twin 1130. The digital twin 1130 can be analyzed in the digital twin environment 1135 to predict future behavior, condition, progression, etc., of the patient 1110, for example. The digital twin 1130 can also be interrogated or queried in the digital twin environment 1135 to retrieve and/or analyze current information 1140, past history, etc.

Figure 12:
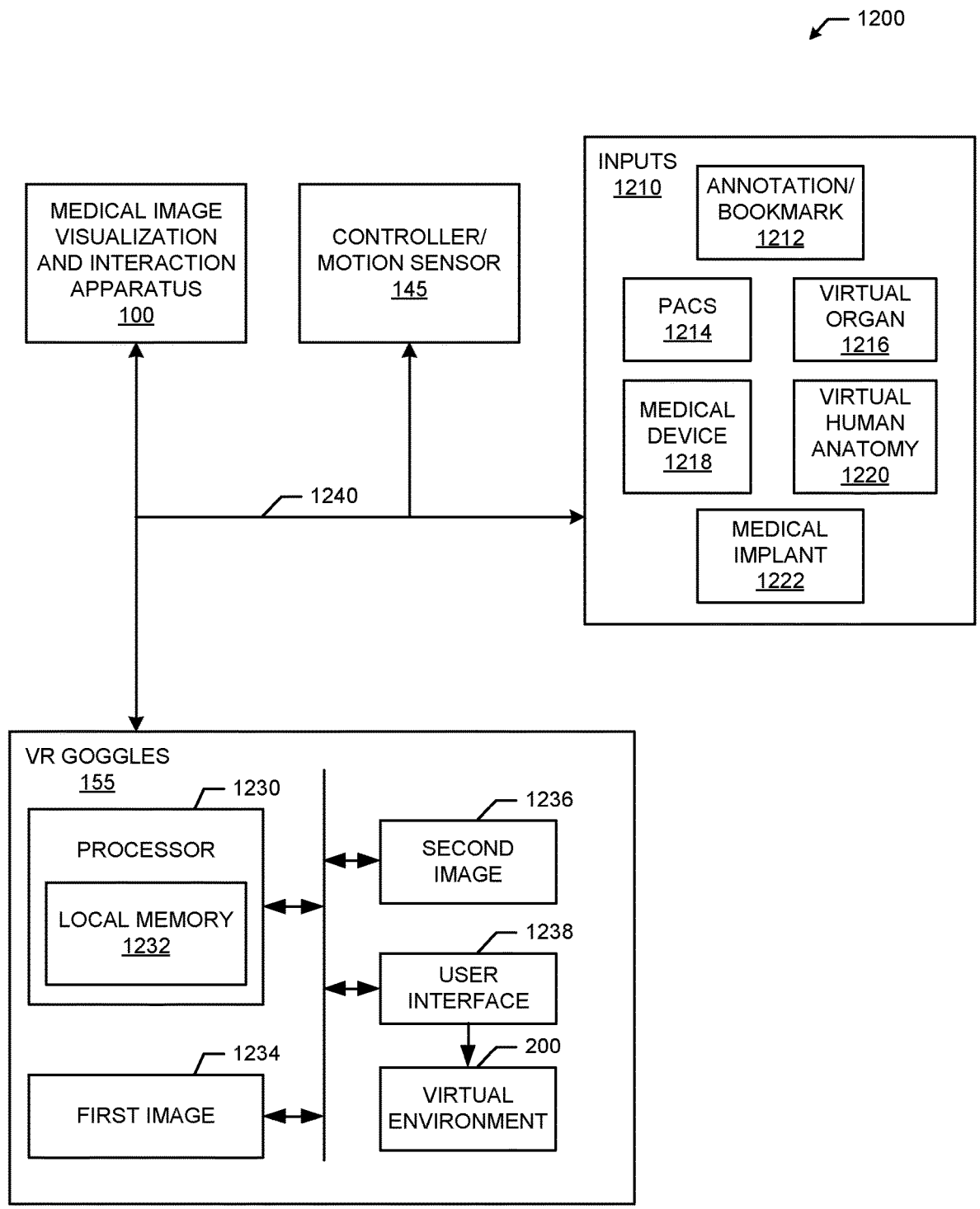
FIG. 12 illustrates an example system implementing the apparatus of FIG. 1 and its virtual environment of FIGS. 2-10.

FIG. 12 illustrates an example system 1200 implementing the apparatus 100 and its virtual environment 200. The example system 1200 includes the medical image visualization and interaction apparatus 100, a controller/motion sensor 145, VR goggles 155, and a set of input 1210 connected via a network 1240 (e.g., a local area network, a wide area network, a cellular network, the Internet, a virtual private network, a Bluetooth connection, a cable/wired connection, etc.).

As shown in the example of FIG. 12, the set of input 1210 includes an annotation/bookmark 1212 (e.g., to an image, an area of an image, a menu or set of tools 230, etc.), image content and/or other image-related data from a PACS and/or other data source (e.g., EMR, RIS, enterprise archive, etc.) 1214, a data model (e.g., a digital twin, 3D reconstruction, etc.) of a virtual organ 1216, a medical device or instrument model or avatar 1218 (e.g., a data model, digital twin, etc., of a scalpel, probe, drill, clamp, other tool, etc.), a virtual human anatomy 1220 (e.g., a whole body patient avatar/digital twin/electronic model, a model of a portion of the human anatomy, etc.), a medical implant 1222 (e.g., a data model, digital twin, etc., of a stent, pin, screw, other implant, etc.), etc. Thus, one or more of the inputs 1210 can be provided to the apparatus 100 to generate the virtual environment 200.

Using the VR goggles 155, a user can interact with the virtual environment 200. In the example of FIG. 12, the goggles 155 include a processor 1230 and a memory 1232, which work together to provide a first image 1234 and a second image 1236 displayed in the virtual environment 200 via a user interface 1238 (e.g., screen(s), speaker(s), etc., mounted in the goggles 155). The controller/motion sensor 145 provides control/selection input, feedback, etc., to allow the user to interact with the virtual environment 200 that he/she experiences via the goggles 155, for example.

While an example implementation of the apparatus 100 and its virtual environment 200 are illustrated in FIGS. 1-12, one or more of the elements, processes and/or devices illustrated in FIGS. 1-12 may be combined, divided, rearranged, omitted, eliminated and/or implemented in any other way. Further, the example apparatus 100, the example sensor 145, the example display 150, the example virtual reality display device 155, the example external device 160, etc., may be implemented by hardware, software, firmware and/or any combination of hardware, software and/or firmware. Thus, for example, any of the example apparatus 100, the example sensor 145, the example display 150, the example virtual reality display device 155, the example external device 160, etc., can be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example apparatus 100, the example sensor 145, the example display 150, the example virtual reality display device 155, the example external device 160, etc., is/are hereby expressly defined to include a non-transitory computer readable storage device or storage disk such as a memory, a digital versatile disk (DVD), a compact disk (CD), a Blu-ray disk, etc. including the software and/or firmware. Further still, the example apparatus 100 and/or its virtual environment 200 of FIGS. 1-12 may include one or more elements, processes and/or devices in addition to, or instead of, those illustrated in FIGS. 1-12, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the apparatus 100 and its virtual environment of FIGS. 1-12 are shown in FIGS. 13-16. The machine readable instructions may be an executable program or portion of an executable program for execution by a computer processor such as the processor 1712 shown in the example processor platform 1700 discussed below in connection with FIG. 17. The program may be embodied in software stored on a non-transitory computer readable storage medium such as a CD-ROM, a floppy disk, a hard drive, a DVD, a Blu-ray disk, or a memory associated with the processor 1712, but the entire program and/or parts thereof could alternatively be executed by a device other than the processor 1712 and/or embodied in firmware or dedicated hardware. Further, although the example program is described with reference to the flowcharts illustrated in FIGS. 13-16, many other methods of implementing the example apparatus 100 and its virtual environment 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 13-16 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 13:
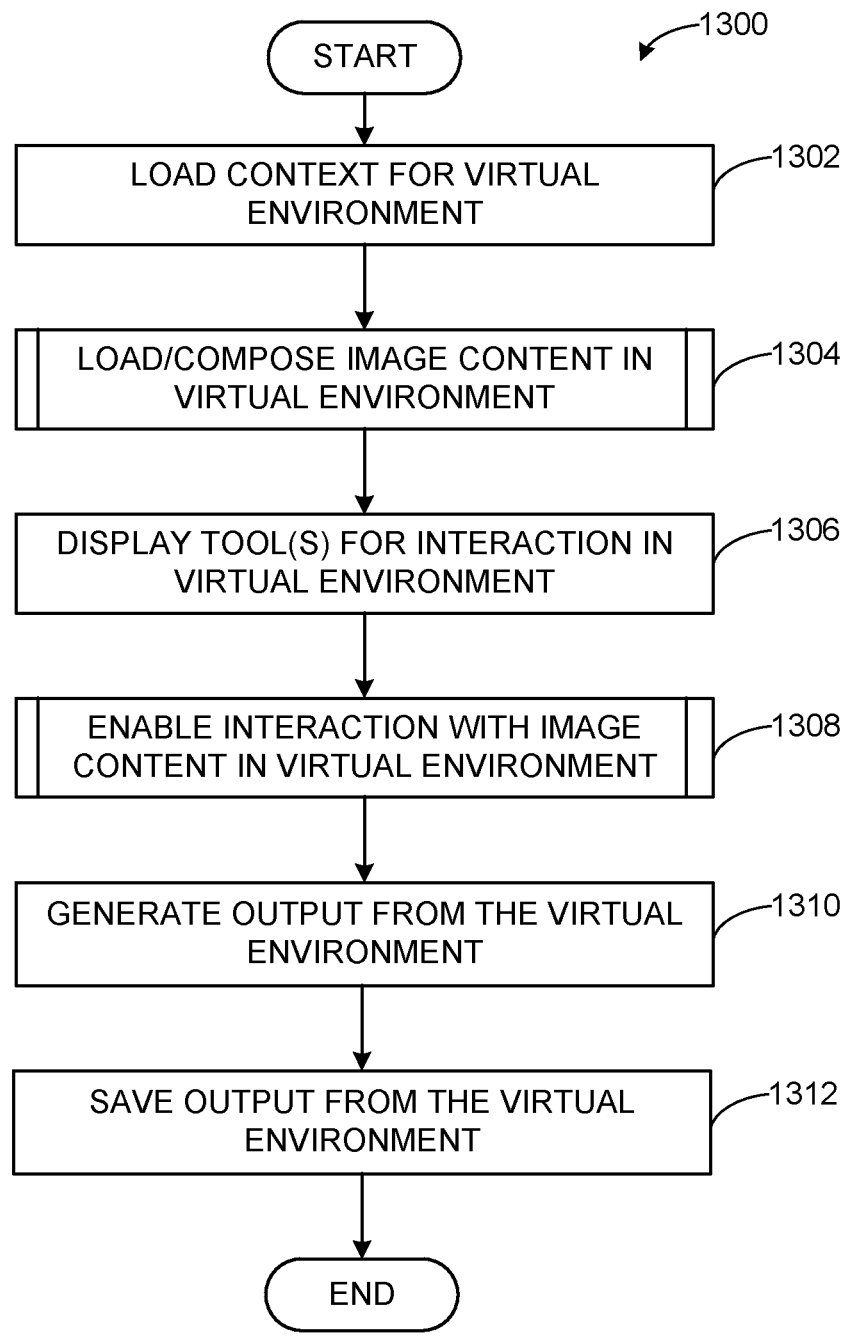
FIGS. 13-16 are flowcharts representative of machine readable instructions which may be executed to implement the apparatus and virtual environment of FIGS. 1-12.

FIG. 13 illustrates a flow diagram of an example method of facilitating interaction with image content via the virtual environment 200. At block 1302, a context is loaded. The context can be a user context, a patient context, and application context, etc. The context can configure the virtual environment 200, set values for one or more parameters, load tools into the menu 230, preload one or more images into the virtual environment 200, position items in the virtual environment 200 in a preset arrangement, etc.

At block 1304, image content can be loaded into and/or composed in the virtual environment 200. For example, 2D and/or 3D image content can be loaded into the virtual environment 200 and overlaid to provide a composite image for user viewing and manipulation. A 2D image cut or slice can be selected and/or otherwise extracted from the 3D image to form the composite image, for example. A CT image slice can be overlaid with PET image data, for example. A plurality of image types can be loaded and/or otherwise composed in the environment 200 for viewing, manipulation, export, etc.

At block 1306, one or more tools are displayed for interaction with the image content in the virtual environment 200. For example, a menu 230 of options to select, rotate, zoom, annotate, tag, overlay, measure, etc., can be displayed with respect to the image content for manipulation in the virtual environment 200. At block 1308, interaction with the displayed image content is enabled. For example, a user can manipulate the displayed image content using the avatar hand(s) 220, by selecting an available menu 230 option, etc. Thus, using the virtual hand 220, the user can move the image content closer, farther, angled, rotated, pull a 2D slice out of a 3D volume, put a 2D slice in a 3D volume, apply a tool and/or other menu 230 option to the image content, position a medical implant and/or instrument with respect to an anatomy in the image content, switch to a different slice view, etc., in the virtual environment 200. In certain examples, the hand 220 and a measurement tool from the menu 230 can be used to measure the position and size of a lesion, tumor, other mass, etc., in the image content via the virtual environment 200.

At block 1310, an output is generated from the virtual environment 200. For example, a composite image, image slice, image volume, annotated tumor measurement, etc., can be generated and output to a secondary display 150, an external system 160, data storage 115, other image data processing and/or clinical decision support application, etc.

At block 1312, the output is saved. For example, the image content and/or related annotation, measurement, reporting, etc., information can be saved in the memory 115, routed to storage and/or application at the external system 160, provided to an image archive, radiology desktop workstation, etc.

Figure 14:
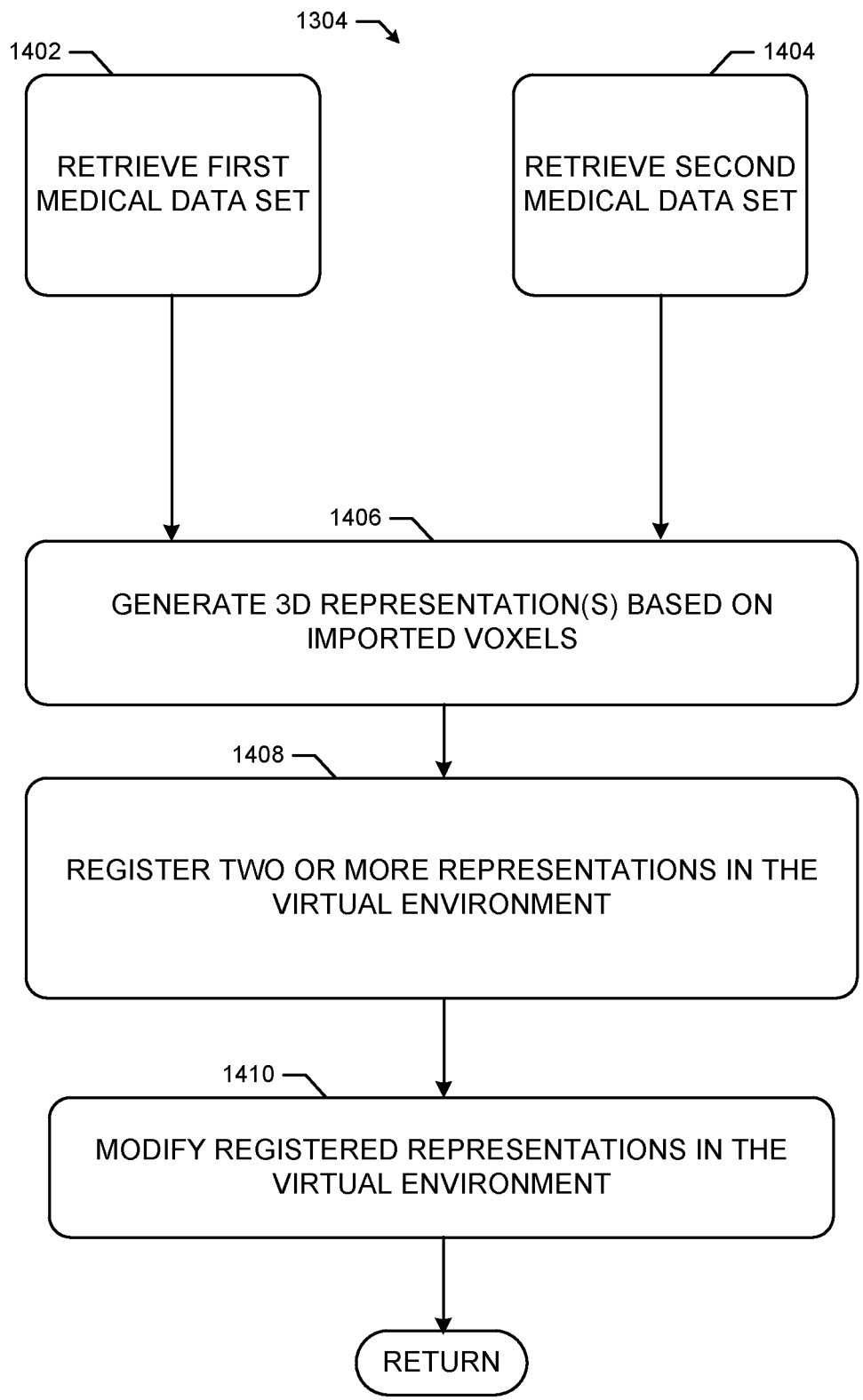

FIG. 14 shows a flow diagram of an example implementation of loading/composing image content in the virtual environment 200 (block 1304 of the example of FIG. 13). At block 1402, a first medical data set is retrieved from a first imaging scanner/imaging device. For example, a CT data set is retrieved from a CT scanner. At block 1404, a second medical data set is retrieved from a second imaging scanner/imaging device. For example, a PET data set is retrieved from a PET CT scanner.

At block 1406, a 3D representation is generated based on imported voxels from the first and/or second medical data sets. For example, the 3D representation can be a mesh representation of the first and/or second medical data sets (e.g., vessels, bones, heart, etc.). The 3D representation can be a reformatted volume generated from the first and/or second medical data sets and/or a volume rendered from the first and/or second medical data sets, for example. An MIP image can be formed from the first and/or second medical data sets, for example. In certain examples, one or more masks can be created in the 3D representation to segment anatomies in the volume.

At block 1408, two or more representations are registered in the virtual environment 200. For example, a 3D volume and a 2D image slice can be spatially registered in the virtual environment 200. A reformatted volume and a mesh can be registered in the virtual environment 200, for example. An MIP image and a rendered volume can be spatially registered in the virtual environment 200, for example.

At block 1410, registered representations are modified in the virtual environment 200. For example, DICOM (Digital Imaging and Communications in Medicine) header data can be used to modify property(-ies) of one or more image representations, such as orientation, opacity, contrast, etc. In certain examples, cuts can be placed in a volume to select which part(s) of a 3D representation to display in the virtual environment 200. In certain examples, masks can be applied to display segmented anatomy(-ies).

Figure 15:
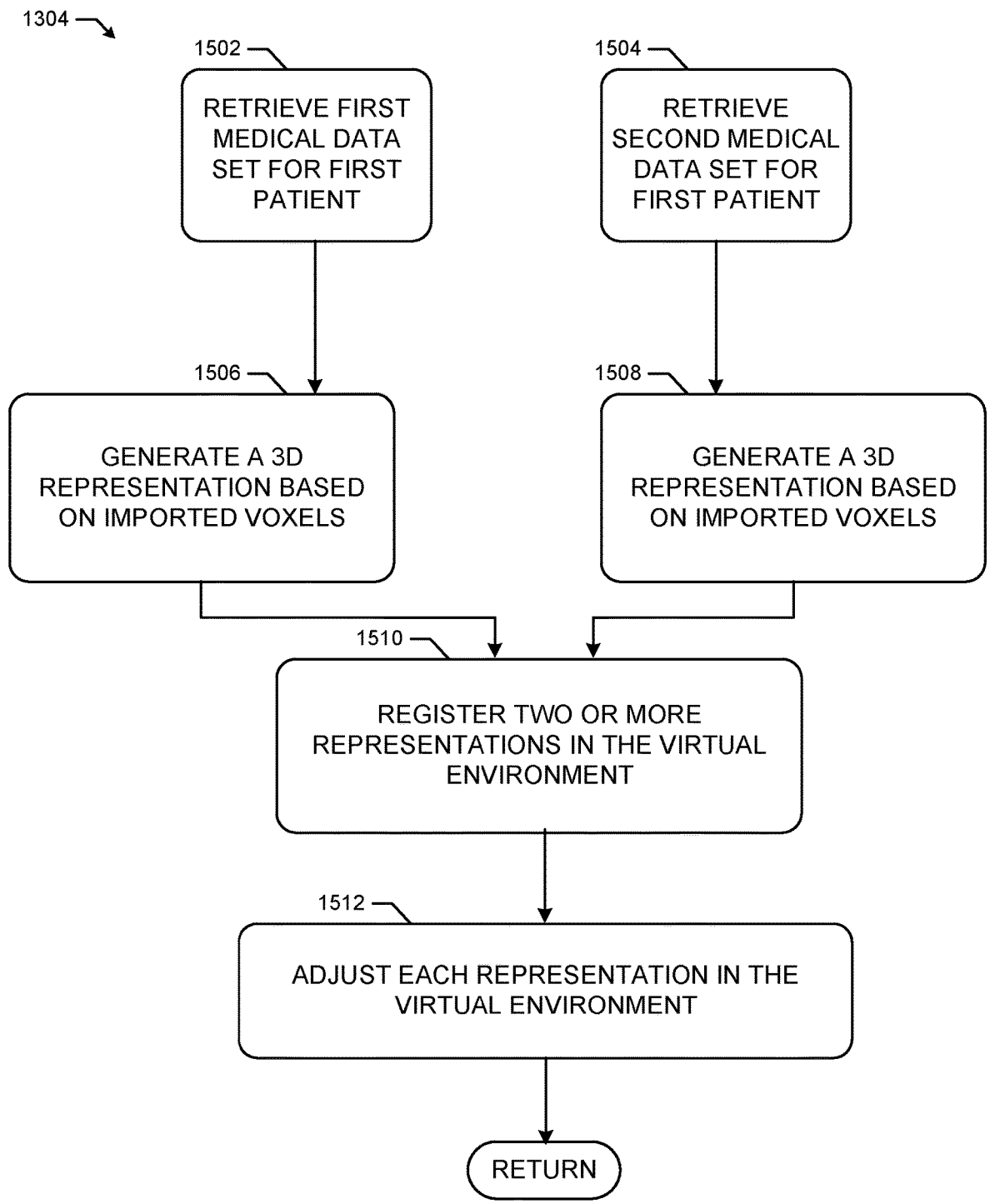

FIG. 15 shows a flow diagram of another example implementation of loading/composing image content in the virtual environment 200 (block 1304 of the example of FIG. 13). At block 1502, a first medical data set is retrieved from a first imaging scanner/imaging device (e.g., MRI, CT, PET, etc.) for a first patient. At block 1504, a second medical data set is retrieved from a second imaging scanner/imaging device (e.g., MRI, CT, PET, etc.) for the first patient.

At block 1506, a first 3D representation is generated based on imported voxels from the first medical data set. For example, the 3D representation can be a mesh representation of the first medical data set (e.g., vessels, bones, heart, etc.). The 3D representation can be a reformatted volume generated from the first medical data set and/or a volume rendered from the first medical data set, for example. An MIP image can be formed from the first medical data set, for example. In certain examples, one or more masks can be created in the 3D representation to segment anatomies in the volume.

At block 1508, a second 3D representation is generated based on imported voxels from the second medical data set. For example, the 3D representation can be a mesh representation of the second medical data set (e.g., vessels, bones, heart, etc.). The 3D representation can be a reformatted volume generated from the second medical data set and/or a volume rendered from the second medical data set, for example. An MIP image can be formed from the second medical data set, for example. In certain examples, one or more masks can be created in the 3D representation to segment anatomies in the volume.

At block 1510, the two or more representations are registered in the virtual environment 200. For example, a 3D volume and a 2D image slice can be spatially registered in the virtual environment 200. A reformatted volume and a mesh can be registered in the virtual environment 200, for example. An MIP image and a rendered volume can be spatially registered in the virtual environment 200, for example.

At block 1512, each registered representation is separately adjusted in the virtual environment 200. For example, DICOM (Digital Imaging and Communications in Medicine) header data can be used to modify property(-ies) of one or more image representations, such as orientation, opacity, contrast, etc. In certain examples, cuts can be placed in a volume (e.g., using the virtual avatar hands 220, etc.) to select which part(s) of a 3D representation to display in the virtual environment 200. In certain examples, masks can be applied to display segmented anatomy(-ies). A MIP selection, orientation, window width, window level, etc., can be adjusted for one or more of the representations. Volume rendered opacity can be adjusted, for example. Masks can be applied to volume-rendered image(s) to display segmented anatomy(-ies), for example.

Figure 16:
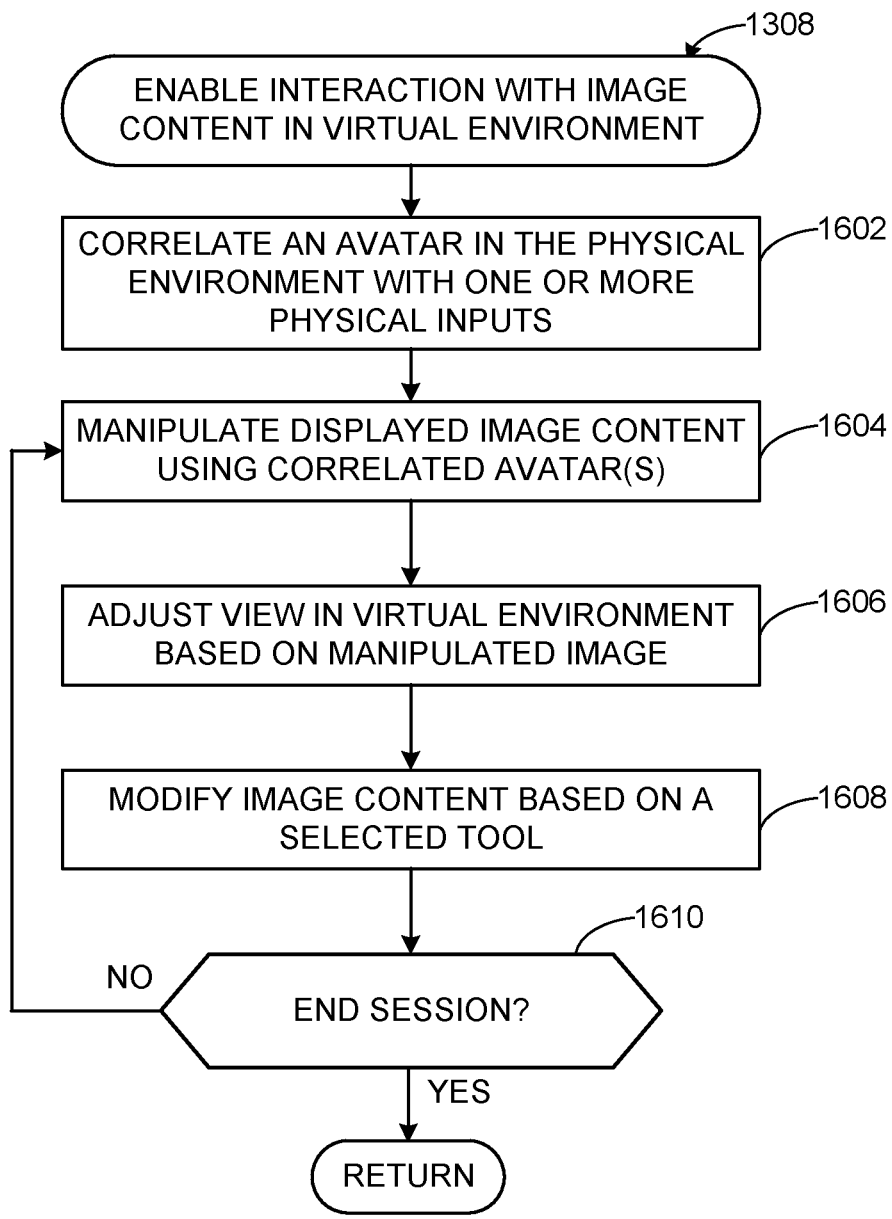

FIG. 16 shows a flow diagram of an example implementation of enabling interaction with the displayed image content in the virtual environment 200 (block 1308 of the example of FIG. 13). At block 1602, an avatar 220 in the virtual environment 200 is correlated with one or more physical inputs 145, 155, 160. For example, one or more hands, eyes, and/or other avatars 220 in the virtual environment 200 are correlated with input device(s) such as sensor(s) 145, goggle(s) 155, other external device(s) 160, etc.

At block 1604, the displayed image content is manipulated in the virtual environment 200 using the correlated avatar(s). For example, the image content can be rotated, angled, pulled, pushed, separated, combined, adjusted, etc. The avatar hand(s) 220 enable the image content to be manipulated in the virtual environment 200, for example.

At block 1606, a view in the virtual environment 200 is adjusted based on the manipulated image content. For example, based on the manipulation of the image content (e.g., movement of the image content, triggering an overlay or separation of the image content, etc., the view(s) available in the virtual environment 200 change (e.g., the image content is moved to a different position/angle/etc., the appearance of the image content changes through overlay/separation/etc., etc.).

At block 1608, the image content is modified based on a selected tool. For example, a filter, overlay model (e.g., stent, screw, scalpel, probe, catheter, etc.), measurement and/or annotation tool, etc., can be selected from the menu 230 and applied to the displayed image content (e.g., applying a filter to the image content, adding a measurement and/or other annotation to the image content, positioning a stent with respect to the displayed image content, change a MIP of the displayed image content, etc.).

At block 1610, input is examined to determine whether an end of session command or action has been received. For example, an end of session command can include moving the avatar hand 220 to close or otherwise exit the virtual environment 200. Selecting a menu 230 option to exit, logout, shutdown, etc., can be an end of session command, for example. If no end of session command is received, the example process then loops back to block 1604 to correlate new hand movements in the virtual environment 200. Thus, absent a command, movement, or other trigger to exit, the user can continue interacting with image content in the virtual environment 200.

Thus, certain examples enable different types of presentations from different types of acquisitions to be displayed in an interactive, immersive virtual reality environment. In certain examples, a second view is provided to show only native images to enable the user to understand how the native view relates to the 3D model created from a series of native views and interact with both the native 2D view and the constructed 3D model. The second view can show an annotated location of the native data set on the 3D model view, for example, and an orientation of the native 2D image data can be kept in line with the anatomy of the 3D model, for example. Thus, a user can understand what he/she is seeing in the 2D native image and how that image relates to the overall anatomy in the 3D model, for example. As a user moves around the 3D volume in the virtual environment, a 2D image slice corresponding to that position in the volume can be shown adjacent to the 3D volume (e.g., to the right, left, top, bottom, or overlay of the 3D model).

Certain examples provide new technical capabilities in a virtual environment. For example, via avatar hand(s) and/or other manipulation aids, a user can grab image content, move the image content, and deposit the image content where desired (e.g., on its own, to overlay, to separate, etc.). A slice view corresponding to a selected position can automatically be displayed. In certain examples, a level of zoom in the 3D model corresponds to a level of zoom in the 2D slice. A position of the slice in the 3D model can be shown.

Further, while it is complicated for a user to locate a reference plane and/or other plane of interest in a 2D image slice, planes can be selected and/or positioned by virtual hand in the virtual environment. For example, if a patient is suspected to have a brain aneurism, the doctor has to confirm the presence of the aneurism by placing planes on the patient's head and neck, which is a challenge. In the 3D view in the virtual environment, however, the doctor can select/place plane(s) using the virtual avatar hand(s) and/or other indicator(s) in the virtual environment, rather than manipulating a cursor in a 2D view. Thus, the virtual environment disclosed and described herein provides new tools, display, and interaction to manipulate image content with virtual hands in the virtual environment to move, label, set a plane, etc.

Figure 17:
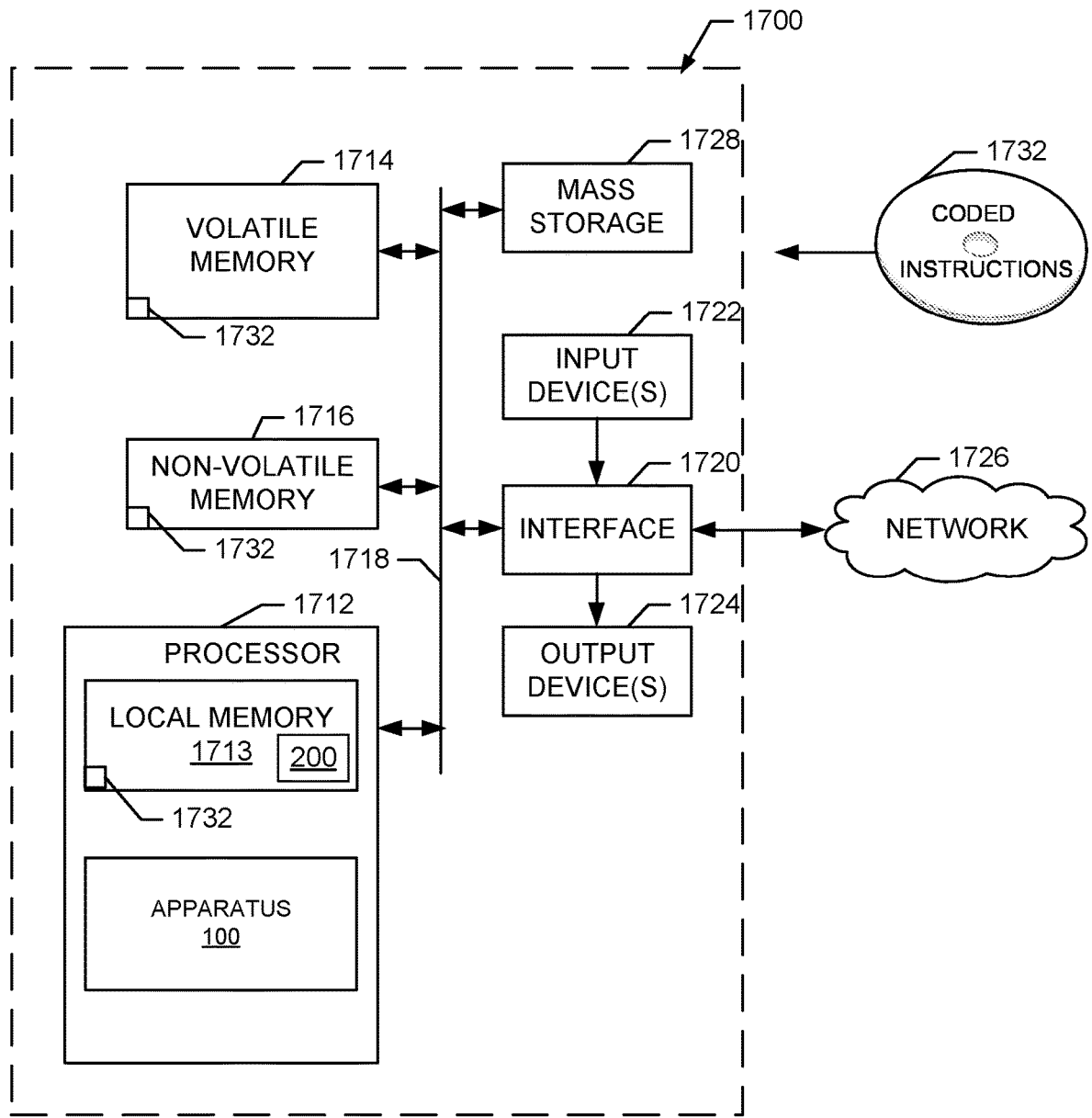
FIG. 17 is a block diagram of an example processing platform structured to execute the instructions of FIGS. 13-16 to implement the apparatus and virtual environment of FIGS. 1-12.

FIG. 17 is a block diagram of an example processor platform 1700 structured to execute the instructions of FIGS. 13-16 to implement the apparatus 100 and its virtual environment 200 of FIGS. 1-12. The processor platform 1700 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example apparatus 100, and its virtual environment 200 can be stored in memory.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), a Bluetooth® interface, a near field communication (NFC) interface, and/or a PCI express interface.

In the illustrated example, one or more input devices 1722 are connected to the interface circuit 1720. The input device(s) 1722 permit(s) a user to enter data and/or commands into the processor 1712. The input device(s) can be implemented by, for example, an audio sensor, a microphone, a camera (still or video), a keyboard, a button, a mouse, a touchscreen, a track-pad, a trackball, isopoint, goggles, a headset, a motion controller, a sensor, and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a haptic feedback device, a printer and/or speaker. The interface circuit 1720 of the illustrated example, thus, typically includes a graphics driver card, a graphics driver chip and/or a graphics driver processor.

The interface circuit 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, redundant array of independent disks (RAID) systems, and digital versatile disk (DVD) drives.

The machine executable instructions 1732 of FIGS. 13-16 may be stored in the mass storage device 1728, in the volatile memory 1714, in the non-volatile memory 1716, and/or on a removable non-transitory computer readable storage medium such as a CD or DVD.

From the foregoing, it will be appreciated that example methods, apparatus and articles of manufacture have been disclosed that enable overlay and manipulation of medical images in a virtual environment. The disclosed methods, apparatus and articles of manufacture improve the efficiency of using a computing device by providing a virtual environment including an avatar, tools, and composite image content to be manipulated, separated, combined, moved, measured, annotated, filtered, referenced, etc., within the virtual environment controlled by one or more sensors and a virtual reality display device. The disclosed methods, apparatus and articles of manufacture are accordingly directed to one or more improvement(s) in the functioning of a computer.

Certain examples provide a unique infrastructure and methodology for very fast layout of image content presentations for any part of the anatomy at any zoom and orientation. Certain examples enable building and incorporating of models into the virtual environment for surgical planning, comparison, diagnosis, etc. Certain examples are faster, more accurate, and efficient, enabling measurements and modifications not possible on a two-dimensional screen.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    at least one processor; and
    at least one memory comprising instructions that, in response to execution by the at least one processor, cause the at least one processor to:
        generate a virtual environment for display of image content via a virtual reality display device, the image content comprising a two-dimensional image and a three-dimensional image volume, the two-dimensional image defined with respect to a plane movable within the three-dimensional image volume;
        enable interaction with the image content in the virtual environment via an avatar;
        adjust the image content in the virtual environment based on the interaction by at least changing the two-dimensional image that is displayed in the virtual environment based on movement of the avatar to move the plane within the three-dimensional image volume to extract and display the two-dimensional image; and
        generate an output of image content from the virtual environment.

2. The apparatus of claim 1, wherein the instructions, when executed, cause the at least one processor to import a display of an implant, a medical device, a marker, or a combination thereof into the virtual environment.

3. The apparatus of claim 1, wherein the instructions, when executed, cause the at least one processor to detect a manipulation of a displayed stent in the virtual environment, plot a surgical path, or compute a measurement.

4. The apparatus of claim 1, wherein the virtual environment comprises a display of an anatomical image representing an internal view of an organ or a blood vessel.

5. The apparatus of claim 4, wherein the anatomical image indicates a blood vessel length, a blood vessel diameter, or a combination thereof.

6. The apparatus of claim 1, wherein the virtual environment comprises data from a functional scan, the data representing blood flow or tumor growth.

7. The apparatus of claim 1, wherein the instructions, when executed, cause the at least one processor to provide one or more tools for interaction with the image content to adjust the image content in the virtual environment, the one or more tools comprising a model of an implant to be positioned with respect to the image content.

8. The apparatus of claim 1, wherein the instructions, when executed, cause the at least one processor to provide an avatar that is to allow the two-dimensional image to be extracted from the three-dimensional image volume or inserted into the three-dimensional image volume.

9. The apparatus of claim 8, wherein the extracted two-dimensional image comprises an annotation, a marker, a segmented anatomy, or a combination thereof.

10. The apparatus of claim 1, wherein the instructions, when executed, cause the at least one processor to generate the image content in the virtual environment by at least:
    generating two or more representations based on medical image data retrieved from one or more imaging devices, at least one representation including a three-dimensional representation;
    registering the two or more representations in the virtual environment; and
    presenting the registered two or more representations in the virtual environment for adjustment.

11. The apparatus of claim 1, wherein the virtual reality display device includes virtual reality goggles.

12. A non-transitory computer readable storage medium comprising instructions which, when executed, cause at least one processor to at least:
    generate a virtual environment for display of image content via a virtual reality display device, the image content comprising a two-dimensional image and a three-dimensional image volume, the two-dimensional image defined with respect to a plane movable within the three-dimensional image volume;
    enable interaction with the image content in the virtual environment via an avatar;
    adjust the image content in the virtual environment based on the interaction by at least changing the two-dimensional image that is displayed in the virtual environment based on movement of the avatar to move the plane within the three-dimensional image volume to extract and display the two-dimensional image; and
    generate an output of image content from the virtual environment.

13. The computer readable storage medium of claim 12, wherein the instructions, when executed, cause the at least one processor to import a display of an implant, a medical device, a marker, or a combination thereof into the virtual environment.

14. The computer readable storage medium of claim 12, wherein the instructions, when executed, cause the at least one processor to detect a manipulation of a displayed stent in the virtual environment, plot a surgical path, or compute a measurement.

15. The computer readable storage medium of claim 12, wherein the virtual environment comprises a display of an anatomical image representing an internal view of an organ or a blood vessel.

16. The computer readable storage medium of claim 15, wherein the anatomical image indicates a blood vessel length, a blood vessel diameter, or a combination thereof.

17. The computer readable storage medium of claim 12, wherein the virtual environment comprises data from a functional scan, the data representing blood flow or tumor growth.

18. The computer readable storage medium of claim 12, wherein the instructions, when executed, cause the at least one processor to generate the image content in the virtual environment by at least:
  generating two or more representations based on medical image data retrieved from one or more imaging devices, at least one representation including a three-dimensional representation;
  registering the two or more representations in the virtual environment; and
  presenting the registered two or more representations in the virtual environment for adjustment.

19. A computer-implemented method comprising:
  generating, by executing an instruction using at least one processor, a virtual environment for display of image content via a virtual reality display device, the image content comprising a two-dimensional image and a three-dimensional image volume, the two-dimensional image defined with respect to a plane movable within the three-dimensional image volume;
  enabling interaction with the image content in the virtual environment via an avatar;
  adjusting the image content in the virtual environment based on the interaction by at least changing the two-dimensional image that is displayed in the virtual environment based on movement of the avatar to move the plane within the three-dimensional image volume to extract and display the two-dimensional image; and
  generating an output of image content from the virtual environment.

20. The method of claim 19, wherein enabling the interaction to adjust the image content in the virtual environment comprises enabling manipulation of the image content using the avatar to extract the two-dimensional image from the three-dimensional image volume, insert the two-dimensional image into the three-dimensional volume, adjust a view of the image content, annotate the image content, measure the image content, select a reference plane in the image content, or a combination thereof.

* * * * *